(12) United States Patent
Sekita et al.

(10) Patent No.: US 8,760,114 B2
(45) Date of Patent: *Jun. 24, 2014

(54) INFORMATION PROCESSING APPARATUS, PROGRAM, AND INFORMATION PROCESSING SYSTEM

(71) Applicant: FeliCa Networks, Inc., Tokyo (JP)

(72) Inventors: Suguru Sekita, Saitama (JP); Shogo Kawata, Kanagawa (JP); Shuichi Sekiya, Saitama (JP); Kazuhito Oowada, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,346

(22) Filed: Oct. 23, 2012

(65) Prior Publication Data

US 2013/0043837 A1    Feb. 21, 2013

Related U.S. Application Data

(63) Continuation of application No. 12/814,618, filed on Jun. 14, 2010, now Pat. No. 8,299,752.

(30) Foreign Application Priority Data

Jun. 22, 2009  (JP) ................................ 2009-147727
Jan. 12, 2010  (JP) ................................ 2010-004322

(51) Int. Cl.
*H01M 10/46*    (2006.01)

(52) U.S. Cl.
USPC ......................................................... 320/108

(58) Field of Classification Search
USPC ............................ 320/107, 108, 109, 132, 149
See application file for complete search history.

(56) References Cited

U.S. PATENT DOCUMENTS

| 5,796,334 A | 8/1998 | Chen et al. |
| 6,792,259 B1 | 9/2004 | Parise |
| 8,299,752 B2 * | 10/2012 | Sekita et al. .................. 320/108 |

FOREIGN PATENT DOCUMENTS

JP    2001-339327    12/2001

* cited by examiner

*Primary Examiner* — Edward Tso
(74) *Attorney, Agent, or Firm* — K&L Gates LLP

(57) ABSTRACT

An information processing apparatus includes an antenna having a variable Q value, the antenna being used for performing communication with an external apparatus in a noncontact manner by using a carrier of a predetermined frequency and charging a battery in a noncontact manner by using the carrier, an obtaining unit configured to obtain information about charging of the battery, a determining unit configured to determine whether charging of the battery is to be performed or not on the basis of the information obtained by the obtaining unit, and a setting unit configured to selectively set the Q value of the antenna to a first value or a second value in accordance with a determination result generated by the determining unit, the second value being larger than the first value.

8 Claims, 30 Drawing Sheets

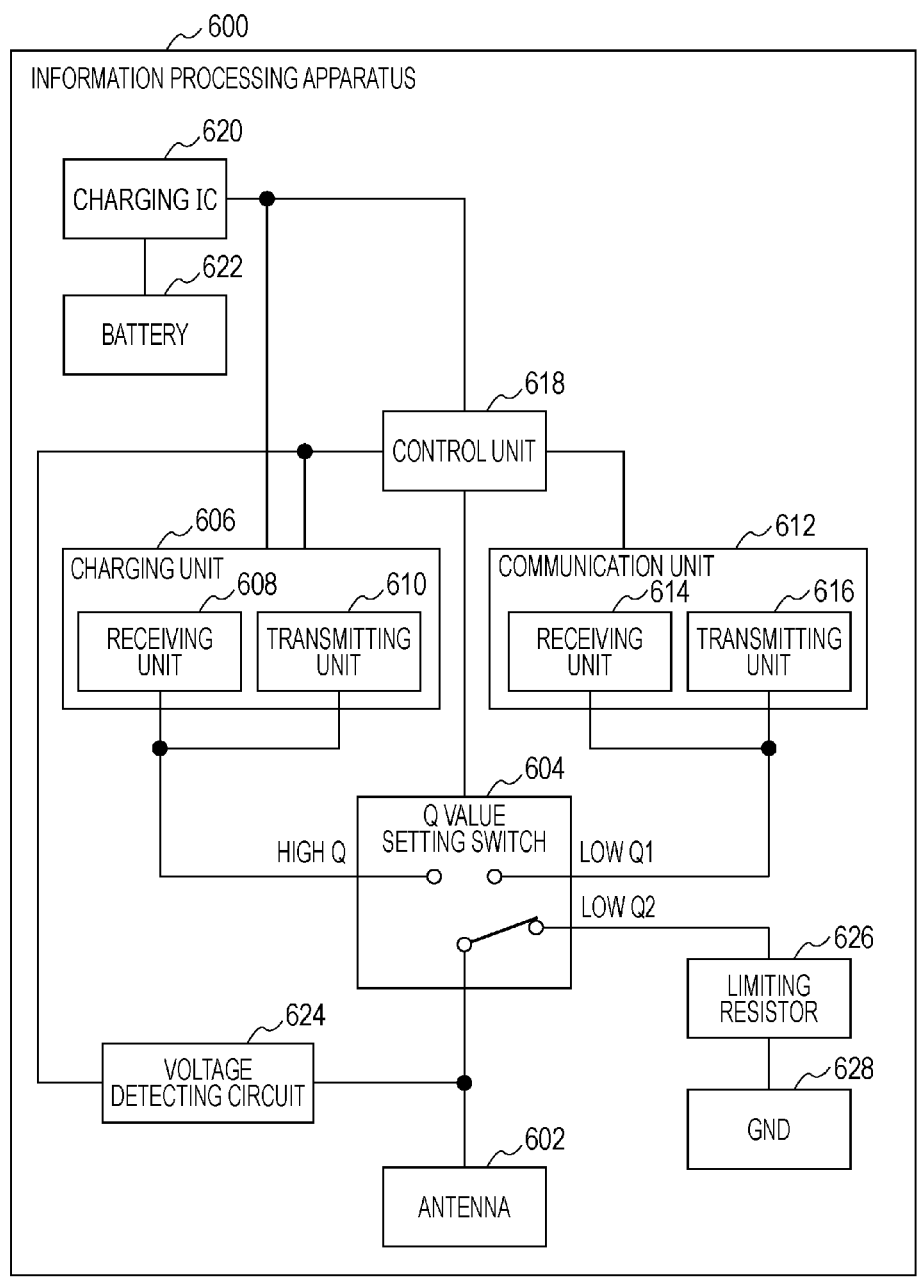

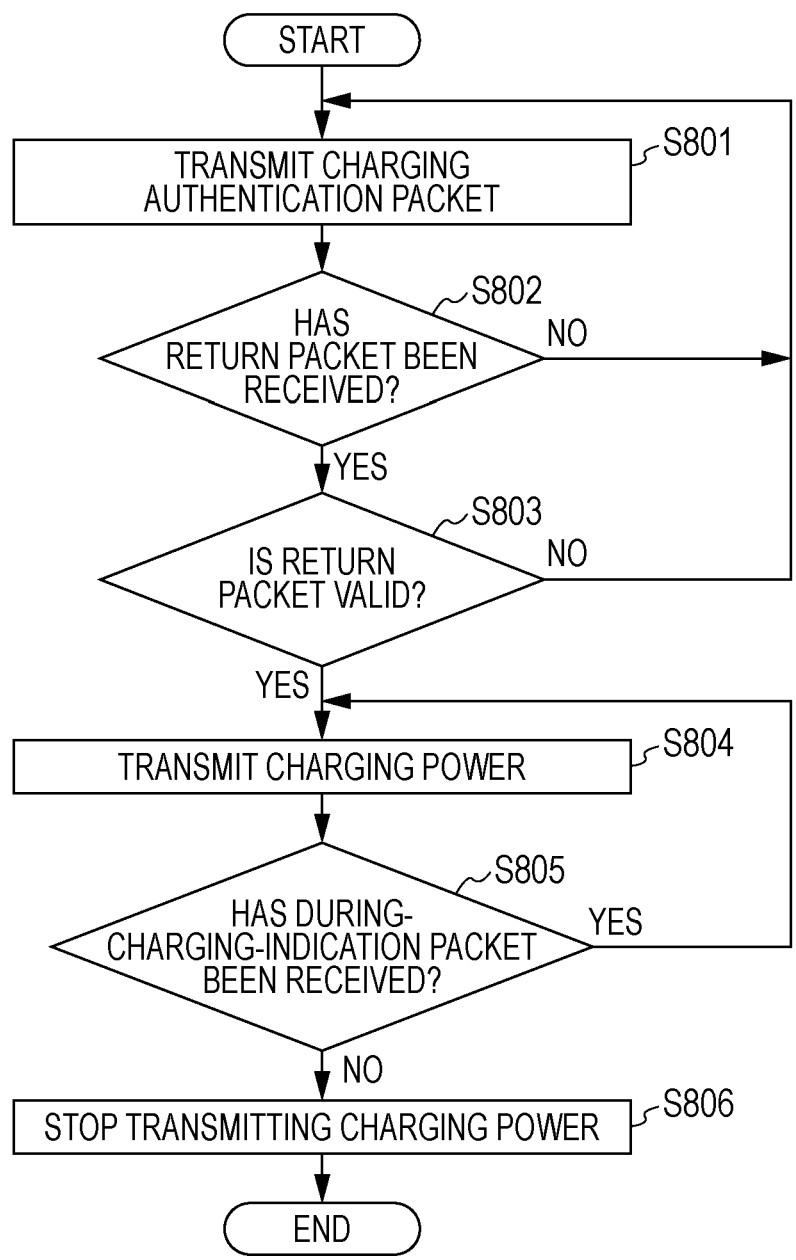

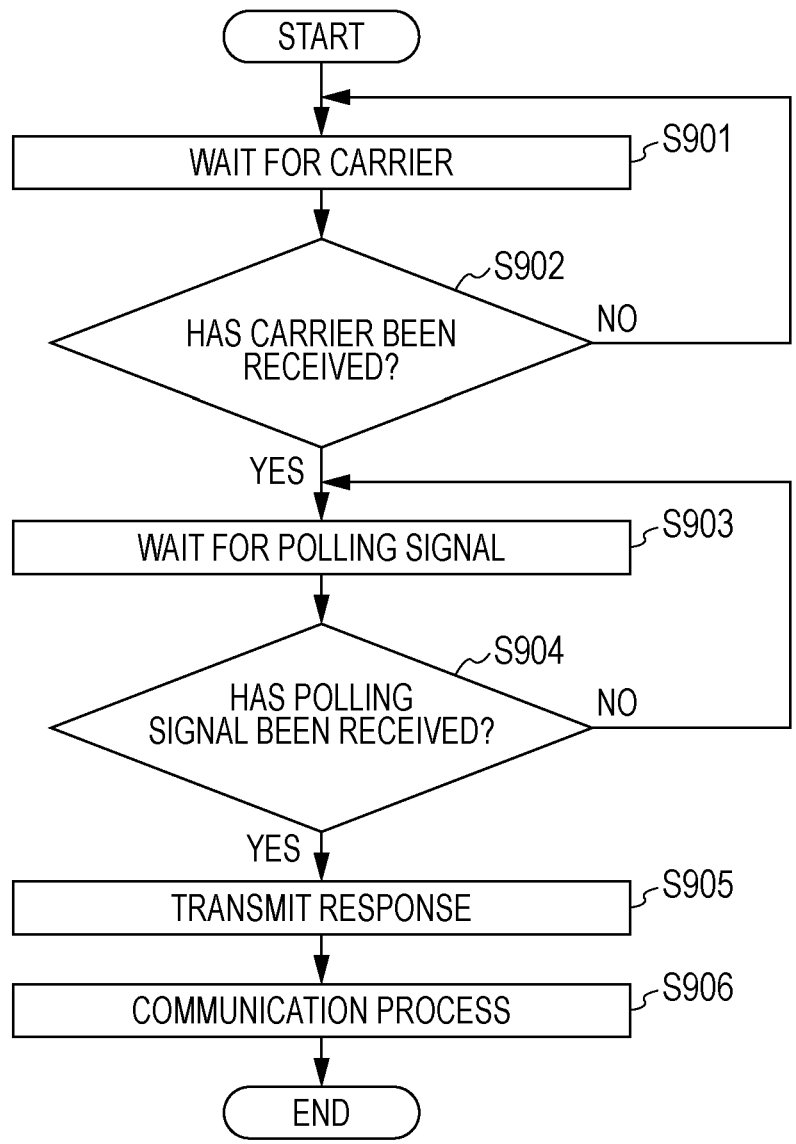

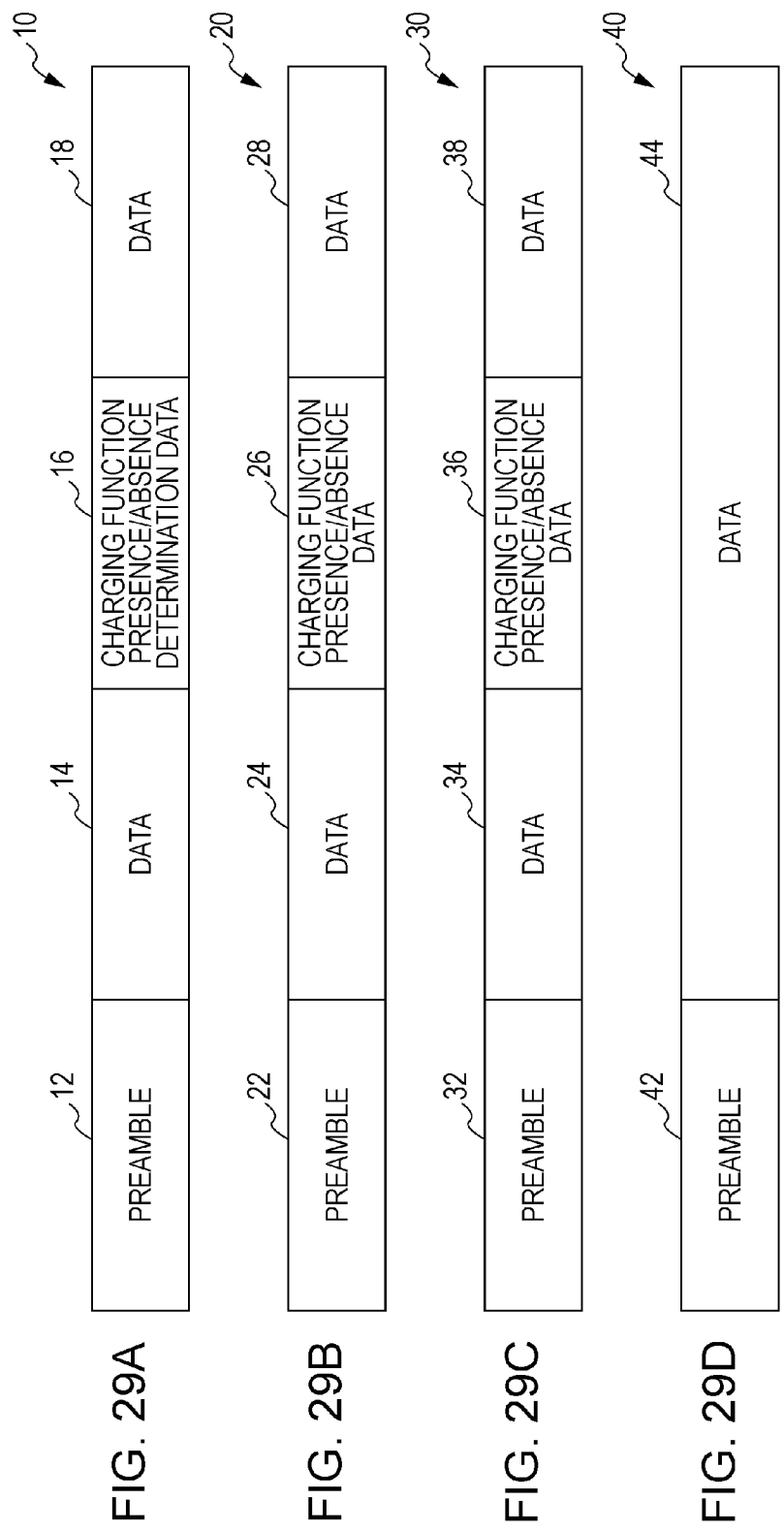

INFORMATION PROCESSING APPARATUS, PROGRAM, AND INFORMATION PROCESSING SYSTEM

CROSS REFERENCES TO RELATED APPLICATIONS

The present application is a continuation of patent application Ser. No. 12/814,618, filed Jun. 14, 2010, which claims priority to Japanese Priority Patent Applications JP 2009-147727 and JP 2010-004322 filed in the Japanese Patent Office on Jun. 22, 2009 and Jan. 12, 2010, respectively, the entire content of which is hereby incorporated by reference.

BACKGROUND

The present application relates to an information processing apparatus, a program, and an information processing system.

In recent years, mobile information processing apparatuses, such as mobile phones, having a noncontact communication function have been widely used.

A mobile information processing apparatus and a reader/writer or the like communicate with each other by using a magnetic field (carrier) of a specific frequency, such as 13.56 MHz. More specifically, the reader/writer transmits a carrier containing a carrier signal, and the mobile information processing apparatus that has received the carrier by using its antenna transmits a response signal to the received carrier signal by using load modulation, whereby the reader/writer and the mobile information processing apparatus communicate with each other.

Concerning information processing apparatuses that perform communication in a noncontact manner, various technologies for efficiently using electric power have been developed. For example, Japanese Unexamined Patent Application Publication No. 2001-339327 discloses an information processing apparatus that performs communication in a noncontact manner. In this information processing apparatus, electric power supplied to an antenna coil in order to detect another information processing apparatus is reduced to be lower than electric power supplied to the antenna coil during information communication that is performed after the other information processing apparatus has been detected.

SUMMARY

Concerning information processing apparatuses, such as mobile phones, having a noncontact communication function, a technology for charging a battery or the like in a noncontact manner has been suggested. Accordingly, it is predicted that a demand for mounting a noncontact charging function in an information processing apparatus in addition to the noncontact communication function will increase.

However, in a case where both the noncontact communication function and noncontact charging function are mounted in an information processing apparatus, antennas for realizing both the functions are necessary, but the performances necessary for the respective antennas are significantly different from each other. For this reason, it is necessary to mount two antennas, one for noncontact charging and the other for noncontact communication, in the information processing apparatus in order to realize both the functions. Considering the demand for miniaturization of an information processing apparatus, addition of a large component, such as an antenna, is not favorable.

If a single antenna is used to realize both the noncontact communication function and noncontact charging function, the efficiency of noncontact charging decreases, the efficiency of data transmission decreases, or communication is difficult to perform, disadvantageously.

Accordingly, it is desirable to provide a new and improved information processing apparatus, program, and information processing system that enable efficient noncontact communication and noncontact charging with the use of a single antenna.

According to an embodiment, there is provided an information processing apparatus including an antenna having a variable Q value, the antenna being used for performing communication with an external apparatus in a noncontact manner by using a carrier of a predetermined frequency and charging a battery in a noncontact manner by using the carrier, an obtaining unit configured to obtain information about charging of the battery, a determining unit configured to determine whether charging of the battery is to be performed or not on the basis of the information obtained by the obtaining unit, and a setting unit configured to selectively set the Q value of the antenna to a first value or a second value in accordance with a determination result generated by the determining unit, the second value being larger than the first value.

With this configuration, noncontact communication and noncontact charging can be efficiently performed by using a single antenna.

The battery may be included in the information processing apparatus. The obtaining unit may include a charging authentication information obtaining unit configured to obtain charging authentication information transmitted from the external apparatus, the charging authentication information serving as information about charging of the battery, and a remaining power information obtaining unit configured to obtain remaining power information of the battery when the charging authentication information obtaining unit obtains the charging authentication information or during charging of the battery, the remaining power information serving as information about charging of the battery. The determining unit may determine whether charging of the battery is to be performed or not on the basis of the remaining power information obtained by the remaining power information obtaining unit. The setting unit may set the Q value of the antenna to the second value when the determining unit determines that charging of the battery is to be performed and set the Q value of the antenna to the first value when the determining unit determines that charging of the battery is not to be performed.

The information processing apparatus may further include a response signal transmitting unit configured to transmit a response signal for responding to the charging authentication information to the external apparatus when the determining unit determines that charging of the battery is to be performed in a case where charging of the battery is not being performed, and a charging continuation information transmitting unit configured to intermittently transmit charging continuation information to the external apparatus when the determining unit determines that charging of the battery is to be performed during charging of the battery.

The charging continuation information transmitting unit may transmit the charging continuation information at a decreased data transmission rate.

The antenna may include a resonance circuit having a coil that has a predetermined inductance and a capacitor that has a predetermined electrostatic capacity, and a Q value changing circuit configured to selectively enable a load for changing the Q value or change a resistance value of the load.

The antenna may include a resonance circuit having a first coil that has a predetermined inductance and a capacitor that has a predetermined electrostatic capacity, and a circuit that is placed near the resonance circuit, that is selectively enabled to change the Q value, that is electrically insulated from the resonance circuit, and that has a second coil.

The setting unit may set the Q value of the antenna from the first value to the second value when the battery is exhausted to turn off the information processing apparatus.

The setting unit may set the Q value of the antenna from the second value to the first value when a remaining power of the battery is equal to or higher than a predetermined threshold after the battery is exhausted to turn off the information processing apparatus.

The information processing apparatus may further include a voltage detecting unit configured to detect a voltage input to the antenna, a resistor one end of which is connected to a ground, and a connection control unit configured to control connection between the antenna and the other end of the resistor on the basis of a detection result generated by the voltage detecting unit.

The connection control unit may connect the antenna to the other end of the resistor when a voltage input to the antenna is equal to or higher than a predetermined first threshold in a case where the Q value of the antenna is set to the first value.

The connection control unit may disconnect the antenna from the other end of the resistor when a voltage input to the antenna is lower than a predetermined second threshold.

The battery may be included in the external apparatus. The obtaining unit may include a response signal obtaining unit configured to obtain a response signal that is transmitted from the external apparatus, that is a response to charging authentication information transmitted to the external apparatus, and that serves as information about charging of the battery, and a charging continuation information obtaining unit configured to obtain charging continuation information that is intermittently transmitted from the external apparatus during charging of the battery and that serves as information about charging of the battery. The determining unit may determine whether charging of the battery is to be performed or not on the basis of the response signal obtained by the response signal obtaining unit or the charging continuation information obtained by the charging continuation information obtaining unit. The setting unit may set the Q value of the antenna to the second value when the determining unit determines that charging of the battery is to be performed and set the Q value of the antenna to the first value when the determining unit determines that charging of the battery is not to be performed.

The information processing apparatus may further include a power transmitting unit configured to transmit power for charging the battery to the external apparatus, and a power transmission stop unit configured to stop transmission of the power by the power transmitting unit when the charging continuation information obtaining unit stops obtaining the charging continuation information that is intermittently obtained.

According to another embodiment, there is provided a program causing a computer to execute obtaining information about charging of a battery via an antenna having a variable Q value and/or internally, the antenna being used for performing communication with an external apparatus in a noncontact manner by using a carrier of a predetermined frequency and charging the battery in a noncontact manner by using the carrier, determining whether charging of the battery is to be performed or not on the basis of the obtained information about charging of the battery, and selectively setting the Q value of the antenna to a first value or a second value in accordance with a result of the determining, the second value being larger than the first value.

With the use of this program, noncontact communication and noncontact charging can be efficiently performed by using a single antenna.

According to another embodiment, there is provided an information processing system including an information processing apparatus and a charging apparatus. The information processing apparatus includes a battery, a first antenna having a variable Q value, the first antenna being used for performing communication with the charging apparatus in a noncontact manner by using a carrier of a predetermined frequency and charging the battery in a noncontact manner by using the carrier, a first obtaining unit configured to obtain first information about charging of the battery, a first determining unit configured to determine whether charging of the battery is to be performed or not on the basis of the first information obtained by the first obtaining unit, and a first setting unit configured to selectively set the Q value of the first antenna to a first value or a second value in accordance with a determination result generated by the first determining unit, the second value being larger than the first value. The charging apparatus includes a second antenna having a variable Q value, the second antenna being used for performing communication with the information processing apparatus in a noncontact manner by using the carrier and charging the battery in a noncontact manner by using the carrier, a second obtaining unit configured to obtain second information about charging of the battery, a second determining unit configured to determine whether charging of the battery is to be performed or not on the basis of the second information obtained by the second obtaining unit, and a second setting unit configured to selectively set the Q value of the second antenna to a third value or a fourth value in accordance with a determination result generated by the second determining unit, the fourth value being larger than the third value.

With this configuration, noncontact communication and noncontact charging can be efficiently performed by using a single antenna.

As described above, according to an embodiment, noncontact communication and noncontact charging can be efficiently performed by using a single antenna.

Additional features and advantages are described herein, and will be apparent from the following Detailed Description and the figures.

BRIEF DESCRIPTION OF THE FIGURES

FIG. 18 is a block diagram illustrating a schematic configuration of an information processing apparatus according to the third embodiment;

FIG. 22 is a flowchart of a charging process performed by the charging apparatus according to the third embodiment;

FIG. 25 is a flowchart of a communication process performed by the information processing apparatus according to the fourth embodiment;

FIGS. 29A to 29D illustrate configurations of charging authentication packets.

DETAILED DESCRIPTION

Figure 1A:
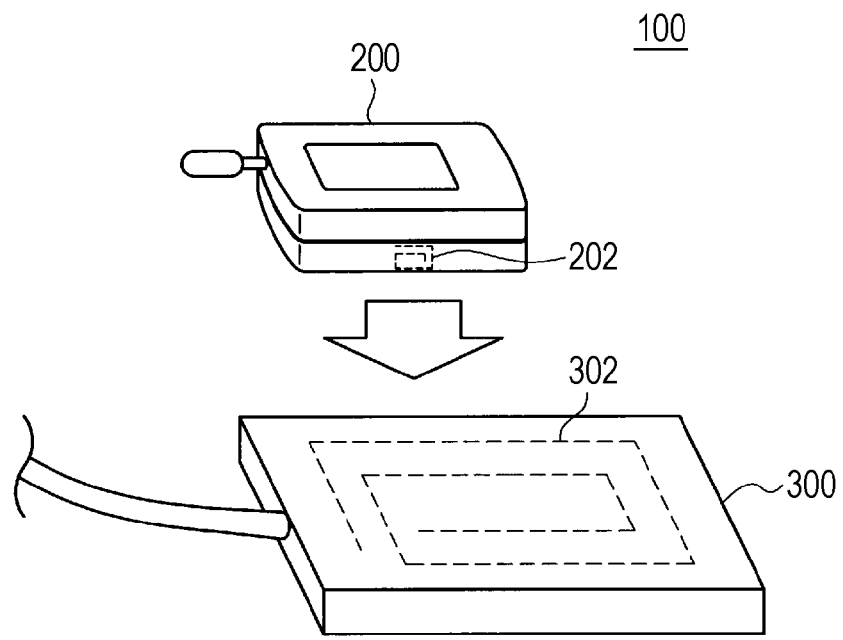
FIG. 1A illustrates an information processing system according to a first embodiment.

The present application will be described in detail below with reference to the drawings according to an embodiment.

The description will be given in the following order.

1. Configuration of information processing system according to first embodiment

2. Schematic configuration of information processing apparatus according to first embodiment 3. Schematic configuration of charging apparatus according to first embodiment 4. First communication/charging process performed by information processing apparatus according to first embodiment 5. First communication/charging process performed by charging apparatus according to first embodiment 6. Specific configuration example of information processing apparatus according to first embodiment 7. Specific configuration example of charging apparatus according to first embodiment 8. Second communication/charging process performed by information processing apparatus according to first embodiment 9. Second communication/charging process performed by charging apparatus according to first embodiment 10. Third communication/charging process performed by information processing apparatus according to first embodiment 11. Configuration of information processing system according to second embodiment 12. Schematic configuration of reader/writer according to second embodiment 13. Communication process performed by reader/writer according to second embodiment 14. Configuration of information processing system according to third embodiment 15. Configuration of information processing apparatus according to third embodiment 16. Configuration of charging apparatus according to third embodiment 17. Communication/charging process performed by information processing apparatus according to third embodiment 18. Charging process performed by charging apparatus according to third embodiment 19. Configuration of information processing system according to fourth embodiment 20. Configuration of information processing apparatus according to fourth embodiment 21. Communication process performed by information processing apparatus according to fourth embodiment 22. Configuration of information processing system according to fifth embodiment 23. Configuration of information processing apparatus according to fifth embodiment 24. Charging process performed by information processing apparatus according to fifth embodiment Configuration of information processing system according to first embodiment First, an information processing system according to a first embodiment will be described with reference to FIGS. 1A and 1B.

Figure 1B:
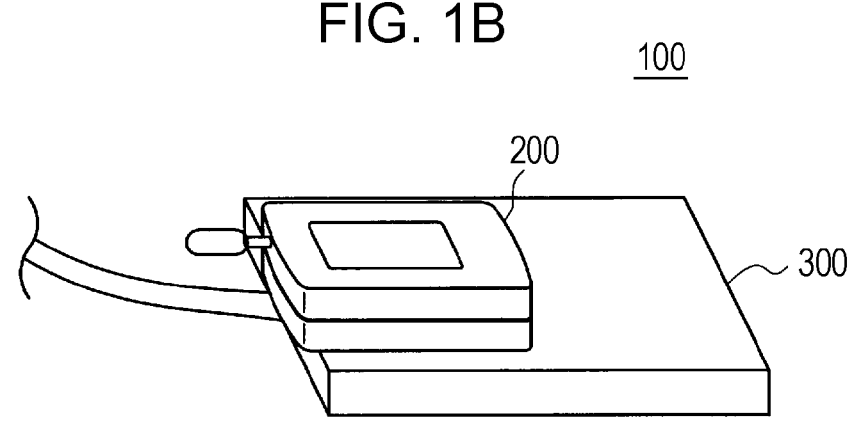
FIG. 1B illustrates the information processing system according to the first embodiment.

FIGS. 1A and 1B illustrate an information processing system 100 according to the first embodiment.

Referring to FIG. 1A, the information processing system 100 includes an information processing apparatus 200, such as a mobile phone terminal, and a charging apparatus 300. The charging apparatus 300 may have a reader/writer function.

The information processing apparatus 200 has a battery therein (not illustrated), and is provided with a single antenna 202 that is used to communicate with the charging apparatus 300 and receive power for charging the battery.

The charging apparatus 300 is provided with a single antenna 302 that is used to communicate with the information processing apparatus 200 and transmit power for charging the battery of the information processing apparatus 200.

In the information processing system 100, as illustrated in FIG. 1B, communication in a noncontact manner and charging in a noncontact manner of the battery of the information processing apparatus 200 are performed when the information processing apparatus 200 is placed on the charging apparatus 300 or when the information processing apparatus 200 is close to the charging apparatus 300. Hereinafter, communication in a noncontact manner is referred to as noncontact communication, and charging in a noncontact manner is referred to as noncontact charging.

The information processing apparatus 200 and the charging apparatus 300 in the above-described information processing system 100 have a noncontact charging function in addition to a noncontact communication function.

In a noncontact charging method according to the related art, an electromagnetic induction method has been put to practical use most actively, in which coupling between coils is used. In a typical electromagnetic induction method, the frequency of a carrier is about hundreds of kHz due to the number of turns necessary for coils. On the other hand, in noncontact communication represented by ISO 18092 or the like, communication is performed by coupling resonant coils, and the frequency of the carrier is typically 13.56 MHz. In a case where a function of noncontact charging based on the electromagnetic induction method and a function of noncontact communication based on ISO 18092 or the like are mounted in the information processing apparatus 200 and the charging apparatus 300, antennas for realizing both the functions are necessary.

However, the performances and the frequencies of carriers necessary for the respective antennas are significantly different from each other. Therefore, it is necessary to mount two antennas, one for noncontact charging and the other for noncontact communication, in the information processing apparatus 200 and the charging apparatus 300 in order to realize both the functions.

On the other hand, a magnetic resonance method is used as a relatively-new method for noncontact charging. In the magnetic resonance method, power is transmitted by coupling antennas having a very high Q value, and about tens of MHz is considered to be an appropriate frequency of the carrier. It is considered that a single antenna can be used for noncontact charging and noncontact communication by using a frequency of 13.56 MHz of a carrier in noncontact communication represented by ISO 18092 or the like.

However, a very high Q value of several hundred to 1000 is necessary for an antenna for noncontact charging based on the magnetic resonance method in order to increase charging efficiency. On the other hand, as an antenna of ISO 18092, an antenna having a suppressed Q value of about 10 to 20 is often used to transmit data. Therefore, mere use a single antenna may cause a problem in that the efficiency of noncontact charging decreases, that the efficiency of data transmission decreases, or that communication is difficult to perform.

Accordingly, in the related art, it is difficult to efficiently perform noncontact communication and noncontact charging by using a single antenna in each of the information processing apparatus 200 and the charging apparatus 300.

In the information processing system 100 according to the first embodiment, the information processing apparatus 200 performs a first communication/charging process described below with reference to FIG. 4, and the charging apparatus 300 performs a first communication/charging process described below with reference to FIG. 5. Furthermore, in the information processing system 100 according to the first embodiment, the information processing apparatus 200 performs a second communication/charging process described below with reference to FIGS. 9 and 10, and the charging apparatus 300 performs a second communication/charging process described below with reference to FIGS. 11 and 12. Accordingly, noncontact communication between the information processing apparatus 200 and the charging apparatus 300 and noncontact charging of the battery of the information processing apparatus 200 can be efficiently performed by using the single antennas in both the apparatuses.

Schematic configuration of information processing apparatus according to first embodiment.

Next, the information processing apparatus 200 according to the first embodiment will be described with reference to FIG. 2.

Figure 2:
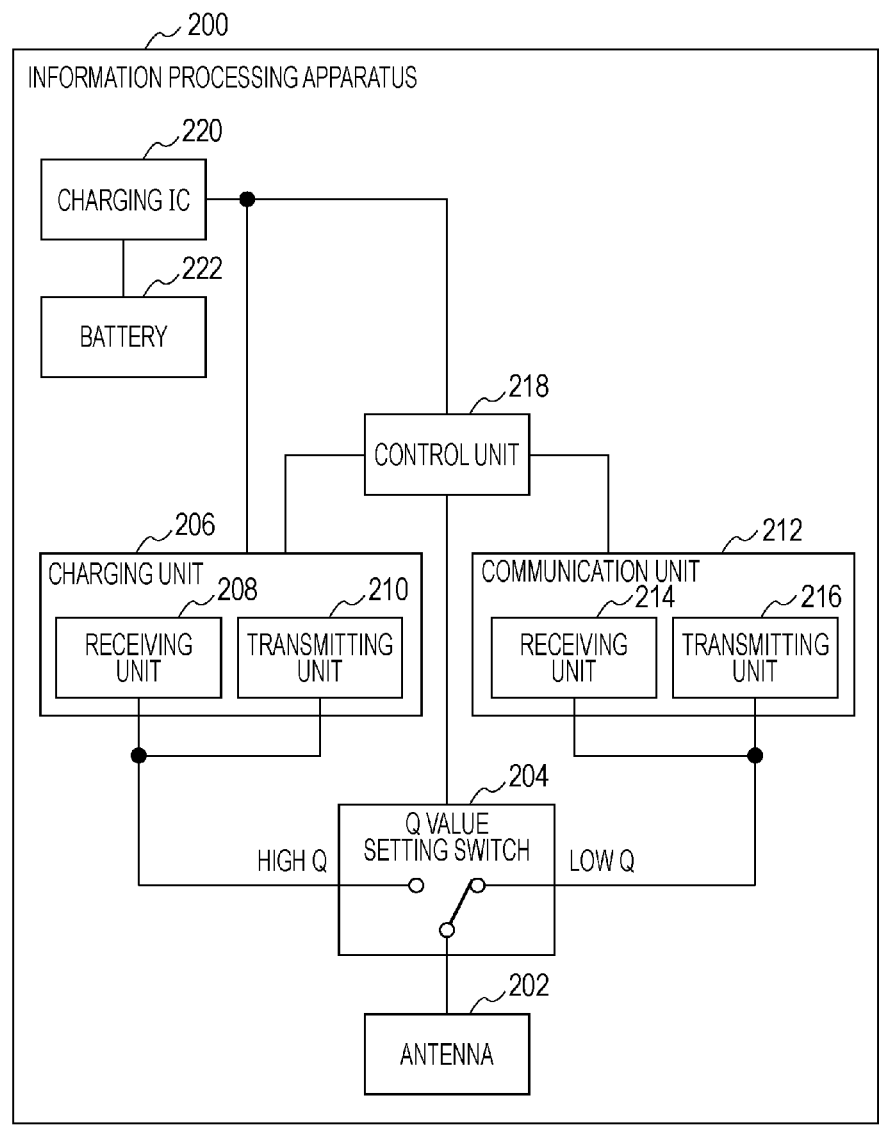
FIG. 2 is a block diagram illustrating a schematic configuration of an information processing apparatus according to the first embodiment.

FIG. 2 is a block diagram illustrating a schematic configuration of the information processing apparatus 200 according to the first embodiment.

Referring to FIG. 2, the information processing apparatus 200 includes an antenna 202, a Q value setting switch 204, a charging unit 206, a communication unit 212, a control unit 218, a charging IC 220, and a battery 222.

The antenna 202 receives a packet for identifying and authenticating a destination of power transmitted from the charging apparatus 300 (hereinafter referred to as "charging authentication packet") and a packet for normal noncontact communication (hereinafter referred to as "communication packet"). Also, the antenna 202 receives power for charging the battery 222 from the charging apparatus 300.

The Q value setting switch 204 selectively sets the Q value of the antenna 202 on the basis of a setting signal transmitted from the control unit 218. Specifically, the Q value setting switch 204 selectively sets the Q value of the antenna 202 so that the Q value of the antenna 202 becomes high or low.

The charging unit 206 includes a receiving unit 208 that receives power for charging the battery 222 received by the antenna 202. Also, the charging unit 206 includes a transmitting unit 210 that intermittently transmits a packet for requesting continuation of transmission of charging power (hereinafter referred to as "continue-charging-request packet") to the charging apparatus 300 until charging of the battery 222 is completed. The transmitting unit 210 transmits a continue-charging-request packet by using load modulation at a data transmission rate lower than a normal data transmission rate.

The communication unit 212 includes a receiving unit 214 that receives a charging authentication packet and a communication packet received by the antenna 202. Also, the communication unit 212 includes a transmitting unit 216 that transmits a response packet for authentication of charging, which is a response to a charging authentication packet received by the receiving unit 214 when charging of the battery 222 is necessary (when charging is to be performed), and a response packet for communication, which is a response to a received communication packet, to the charging apparatus 300. The transmitting unit 216 transmits each response packet by using load modulation at a normal data transmission rate.

The control unit 218 controls the Q value setting switch 214, the charging unit 206, the communication unit 212, and the charging IC 220. After the power of the information processing apparatus 200 has been turned on, the control unit 218 transmits a setting signal for setting the Q value of the antenna 202 to a low Q value to the Q value setting switch 204. That is, the control unit 218 sets the Q value of the antenna 202 to a first value so that data transmission can be efficiently performed. Also, when the receiving unit 214 receives a charging authentication packet, the control unit 218 obtains remaining power information of the battery 222 from the charging IC 220 and determines whether charging of the battery 222 is necessary or not (whether charging is to be performed or not). If charging of the battery 222 is necessary (if charging is to be performed), the control unit 218 causes the transmitting unit 216 to transmit a response packet for authentication of charging. Then, the control unit 218 transmits a setting signal for setting the Q value of the antenna 202 to a high Q value to the Q value setting switch 204. That is, the control unit 218 sets the Q value of the antenna 202 to a second value, which is higher than the first value, whereby reception of power for charging the battery 222 is efficiently performed. Also, when the receiving unit 208 receives power for charging the battery 222 and when the charging IC 220 receives the power for charging the battery 222 from the receiving unit 208, the control unit 218 causes the charging IC 220 to charge the battery 222. During charging of the battery 222, the control unit 218 obtains remaining power information of the battery 222 from the charging IC 220 at predetermined time intervals to determine whether charging of the battery 222 is necessary or not (whether charging is to be performed or not). If charging of the battery 222 is necessary (if charging is to be performed), the control unit 218 causes the transmitting unit 210 to transmit a continue-charging-request packet. In this way, while charging of the battery 222 is necessary, the transmitting unit 210 intermittently transmits a continue-charging-request packet to the charging apparatus 300. On the other hand, if charging of the battery 222 is not necessary (if charging is not to be performed), the control unit 218 does not cause the transmitting unit 210 to transmit a continue-charging-request packet. Then, after a predetermined time has elapsed, the control unit 218 determines whether the receiving unit 208 is receiving power for charging the battery 222 or not. If the receiving unit 208 is not receiving power for charging the battery 222, the control unit 218 transmits a setting signal for setting the Q value of the antenna 202 to a low Q value to the Q value setting switch 204.

The charging IC 220 performs charging of the battery 222 and efficiently supplies the power from the battery 222 to each unit of the information processing apparatus 200.

Schematic configuration of charging apparatus according to first embodiment

Next, the charging apparatus 300 according to the first embodiment will be described with reference to FIG. 3.

Figure 3:
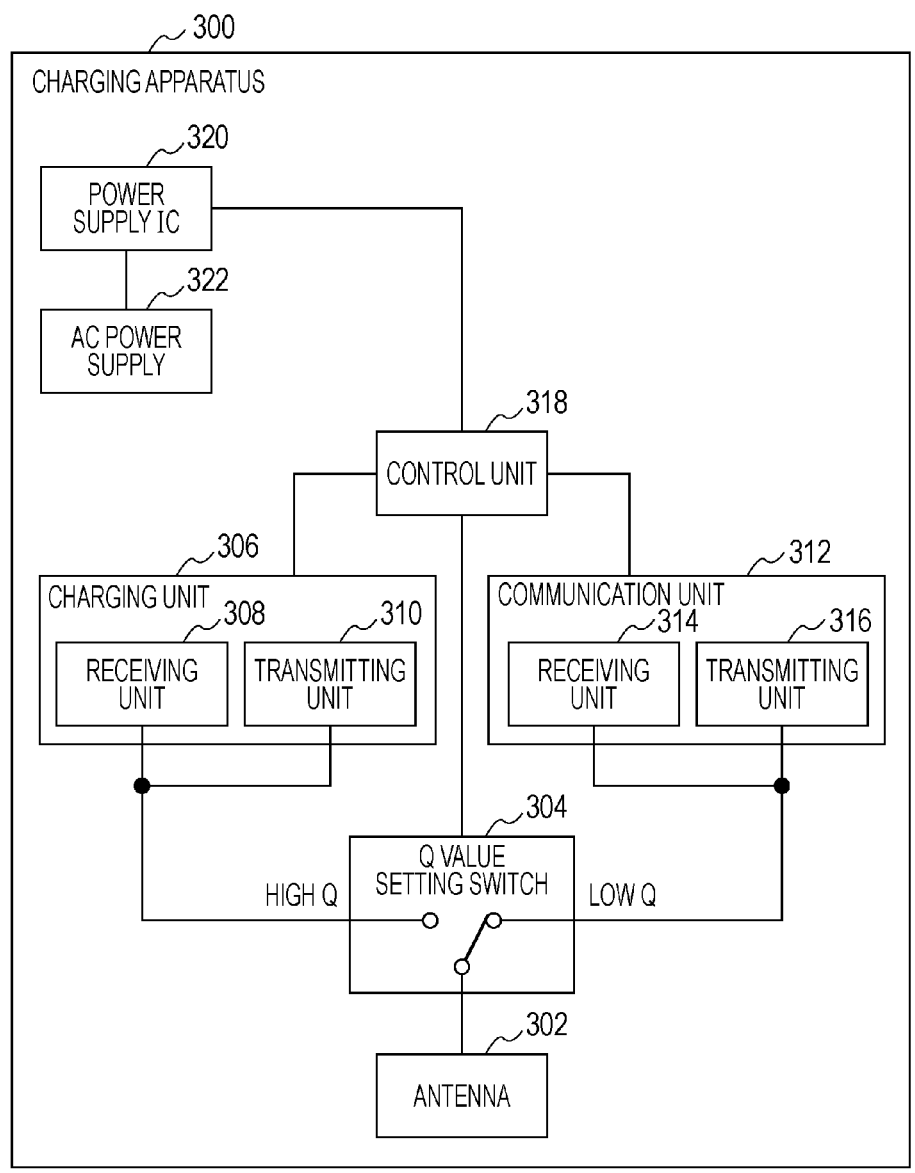
FIG. 3 is a block diagram illustrating a schematic configuration of a charging apparatus according to the first embodiment.

FIG. 3 is a block diagram illustrating a schematic configuration of the charging apparatus 300 according to the first embodiment.

Referring to FIG. 3, the charging apparatus 300 includes an antenna 302, a Q value setting switch 304, a charging unit 306, a communication unit 312, a control unit 318, and a power supply IC 320 connected to an AC power supply 322.

The antenna 302 transmits a charging authentication packet and also transmits power for charging the battery 222 of the information processing apparatus 200. Also, the antenna 302 may transmit a communication packet.

The Q value setting switch 304 selectively sets the Q value of the antenna 302 on the basis of a setting signal transmitted from the control unit 318. Specifically, the Q value setting switch 304 selectively sets the Q value of the antenna 304 so that the Q value of the antenna 302 becomes high or low.

The charging unit 306 includes a receiving unit 308 that receives a continue-charging-request packet transmitted from the information processing apparatus 200 and a transmitting unit 310 that transmits power for charging the battery 222 of the information processing apparatus 200.

The communication unit 312 includes a receiving unit 314 that receives a response packet for authentication of charging transmitted from the information processing apparatus 200 and a transmitting unit 316 that transmits a charging authentication packet.

The control unit 318 controls the Q value setting switch 304, the charging unit 306, the communication unit 312, and the power supply IC 320. After the power of the charging apparatus 300 has been turned on, the control unit 318 transmits a setting signal for setting the Q value of the antenna 302 to a low Q value to the Q value setting switch 304. That is, the control unit 318 sets the Q value of the antenna 302 to a first value so that data transmission can be efficiently performed. Also, the control unit 318 causes the transmitting unit 316 to transmit a charging authentication packet. After that, when the receiving unit 314 receives a response packet for authentication of charging, the control unit 318 determines whether the received response packet for authentication of charging is valid or not. If the response packet for authentication of charging is valid, the control unit 318 determines that charging of the battery 222 of the information processing apparatus 200 is necessary (charging it to be performed), and transmits a setting signal for setting the Q value of the antenna 302 to a high Q value to the Q value setting switch 304. That is, the control unit 318 sets the Q value of the antenna 302 to a second value, which is higher than the first value, so that power for charging the battery 222 can be efficiently transmitted. Then, after a predetermined time has elapsed, the control unit 318 causes the transmitting unit 310 to transmit power for charging the battery 222 of the information processing apparatus 200. After that, the control unit 318 determines, at predetermined time intervals, whether the receiving unit 308 has received a continue-charging-request packet or not. If the receiving unit 308 has received a continue-charging-request packet, the control unit 318 causes the transmitting unit 310 to continue transmitting power. On the other hand, if the receiving unit 308 has not received a continue-charging-request packet, the control unit 318 causes the transmitting unit 310 to stop transmitting power, and transmits a setting signal for setting the Q value of the antenna 302 to a low Q value to the Q value setting switch 304.

The power supply IC 320 efficiently supplies power from the AC power supply 322 to each unit of the charging apparatus 300. Alternatively, the power supply IC 320 may supply power from a DC power supply (not illustrated) to each unit of the charging apparatus 300.

First communication/charging process performed by information processing apparatus according to first embodiment Hereinafter, the first communication/charging process performed by the information processing apparatus 200 illustrated in FIG. 2 will be described.

Figure 4:
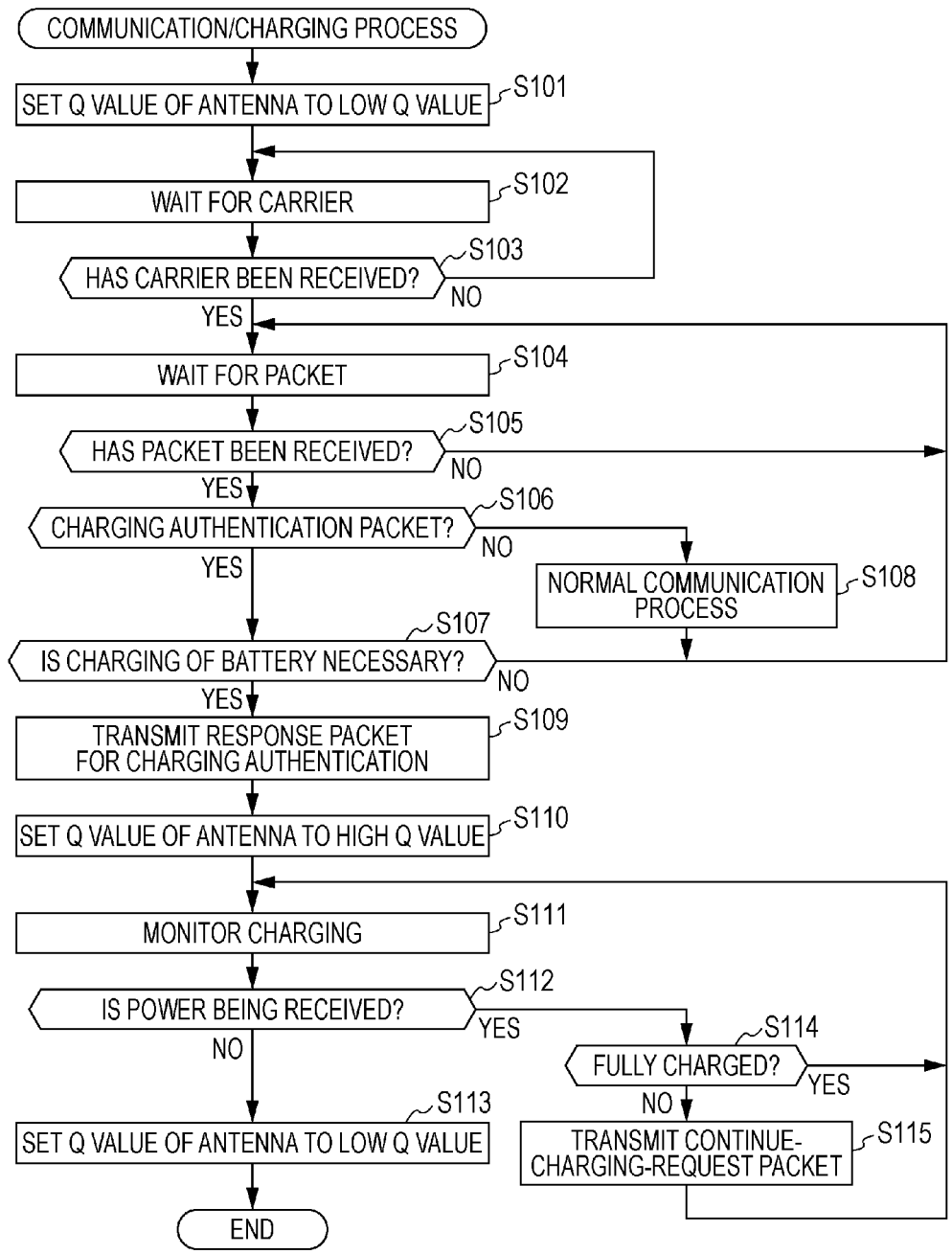
FIG. 4 is a flowchart of a first communication/charging process performed by the information processing apparatus illustrated in FIG. 2.

FIG. 4 is a flowchart of the first communication/charging process performed by the information processing apparatus 200 illustrated in FIG. 2.

Referring to FIG. 4, the control unit 218 of the information processing apparatus 200 transmits a setting signal for setting the Q value of the antenna 202 to a low Q value, for example, 10 to 20 (an example of the first value), to the Q value setting switch 204. The Q value setting switch 204 that has received the setting signal sets the Q value of the antenna 202 to the low Q value (step S101).

Subsequently, the control unit 218 causes the receiving unit 214 of the communication unit 212 to wait for a carrier transmitted from the charging apparatus 300 (step S102).

Subsequently, the control unit 218 determines whether the receiving unit 214 has received a carrier or not (step S103). If the receiving unit 214 has not received a carrier (NO in step S103), the process returns to step S102.

If the receiving unit 214 has received a carrier (YES in step S103), the control unit 218 waits for a packet transmitted from the charging apparatus 300 (step S104).

Subsequently, the control unit 218 determines whether the receiving unit 214 has received a packet or not (step S105). If the receiving unit 214 has not received a packet (NO in step S105), the process returns to step S104.

If the receiving unit 214 has received a packet (YES in step S105), the control unit 218 determines whether the received packet is a charging authentication packet (information about charging of the battery, charging authentication information) or not (step S106).

If the received packet is not a charging authentication packet (NO in step S106), the received packet is a communication packet, and thus the control unit 218 performs a normal communication process in accordance with the packet (step S108), and the process returns to step S104.

If the received packet is a charging authentication packet (YES in step S106), the charging apparatus 300 having a noncontact charging function exists near the information processing apparatus 200. Then, the control unit 218 obtains remaining power information of the battery 222 (information about charging of the battery) from the charging IC 220 and determines whether charging of the battery 222 is necessary or not (whether charging is to be performed or not) on the basis of the obtained remaining power information of the battery 222 (step S107).

If charging of the battery 222 is not necessary (if charging is not to be performed), that is, if the battery 222 is fully charged or if the battery 222 is not connected to the information processing apparatus 200 (NO in step S107), the process returns to step S104 with the control unit 218 not causing the transmitting unit 216 of the communication unit 212 to transmit a response packet for authentication of charging.

If it is determined in step S107 that charging of the battery 222 is necessary (charging is to be performed) (YES in step S107), the control unit 218 causes the transmitting unit 216 to transmit a response packet for authentication of charging (step S109).

The charging apparatus 300 that has received the response packet for authentication of charging transmitted in step S109 starts transmitting power for charging the battery 222 of the information processing apparatus 200 after a predetermined time has elapsed. Thus, the control unit 218 transmits a setting signal for setting the Q value of the antenna 202 to a Q value higher than the Q value that is set in step S101, for example, 50 to several hundred (an example of the second value), to the Q value setting switch 204. The Q value setting switch 204 that has received the setting signal sets the Q value of the antenna 202 to the high Q value (step S110).

Subsequently, the control unit 218 monitors charging of the battery 222 (step S111).

Subsequently, the control unit 218 determines whether the receiving unit 208 of the charging unit 206 is receiving power for charging the battery 222 or not (step S112).

If the receiving unit 208 is receiving charging power (YES in step S112), the control unit 218 obtains remaining power information of the battery 222 from the charging IC 220 and determines whether charging of the battery 222 is necessary or not (whether charging is to be performed or not), that is, whether the battery 222 is fully charged or not (step S114).

If charging of the battery 222 is necessary (if charging is to be performed) (NO in step S114), the control unit 218 causes the transmitting unit 210 of the charging unit 206 to transmit a continue-charging-request packet (step S115), and the process returns to step S111. Additionally, in step S115, the continue-charging-request packet is transmitted at a sufficiently-low data transmission rate so that communication can be performed even if the Q value of the antenna 202 is high.

If charging of the battery 222 is not necessary (if charging is not to be performed) (YES in step S114), the process returns to step S111 with the control unit 218 not causing the transmitting unit 210 of the charging unit 206 to transmit a continue-charging-request packet.

If it is determined in step S112 that the receiving unit 208 is not receiving charging power, that is, if reception of power from the charging apparatus 300 is stopped because the control unit 218 does not cause the transmitting unit 210 of the charging unit 206 to transmit a continue-charging-request packet, or if the information processing apparatus 200 has been moved to the outside of a communication area of the charging apparatus 300 (NO in step S112), the control unit 218 transmits a setting signal for setting the Q value of the antenna 202 to a low Q value to the Q value setting switch 204, the Q value setting switch 204 that has received the setting signal sets the Q value of the antenna 202 to the low Q value (step S113), and the process ends.

According to the first communication/charging process illustrated in FIG. 4, the Q value of the antenna 202 is set to a low Q value when a packet such as a charging authentication packet is received from the charging apparatus 300, and the Q value of the antenna 202 is set to a high Q value when power for charging the battery 222 is received from the charging apparatus 300. When the Q value of the antenna 202 is low, the bandwidth is wide and thus data transmission can be efficiently performed. When the Q value of the antenna 202 is high, the amplitude of a carrier can be increased and thus reception of charging power can be efficiently performed. Accordingly, noncontact communication and noncontact charging can be efficiently performed by using the single antenna.

First Communication/Charging Process Performed by Charging Apparatus According to first embodiment Hereinafter, a first communication/charging process performed by the charging apparatus 300 illustrated in FIG. 3 will be described.

Figure 5:
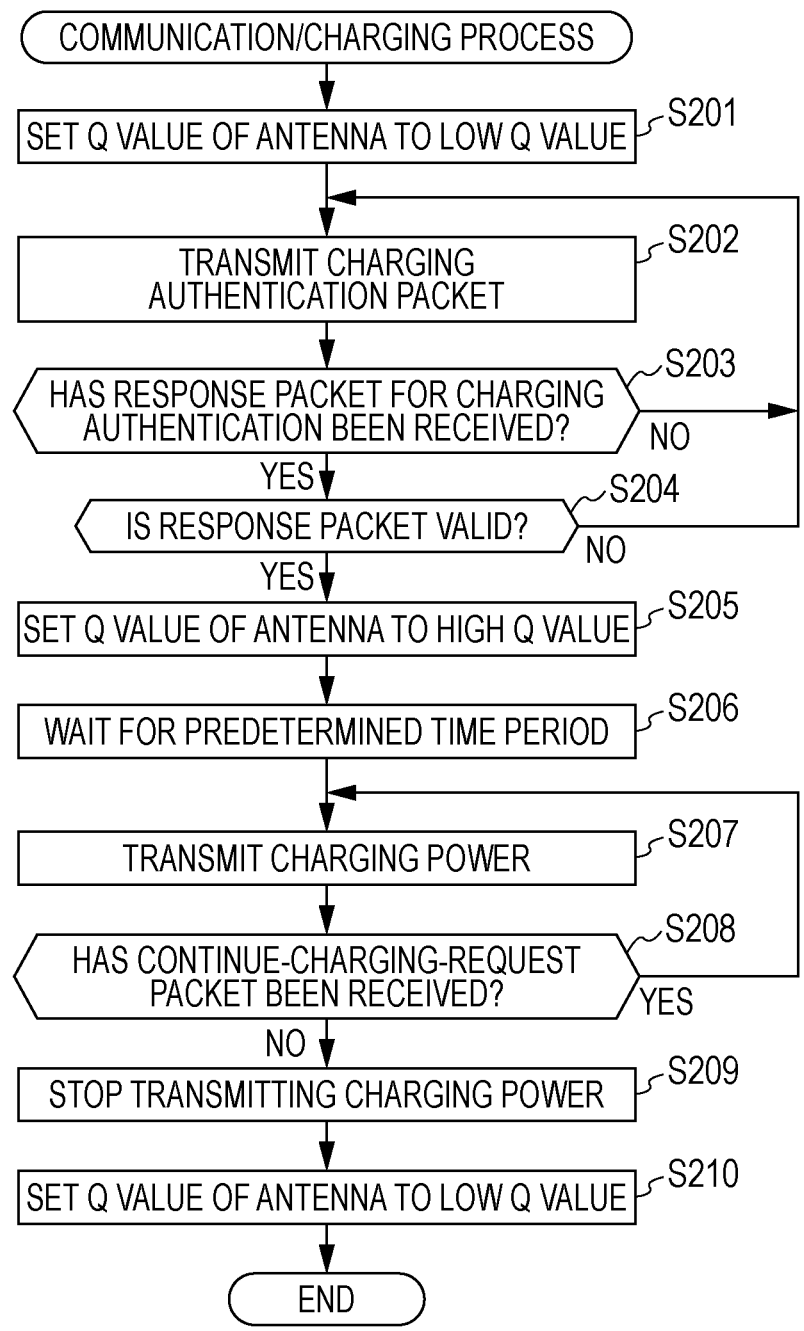
FIG. 5 is a flowchart of a first communication/charging process performed by the charging apparatus illustrated in FIG. 3.

FIG. 5 is a flowchart of the first communication/charging process performed by the charging apparatus 300 illustrated in FIG. 3.

Referring to FIG. 5, the control unit 318 of the charging apparatus 300 transmits a setting signal for setting the Q value of the antenna 302 to a low Q value, for example, 10 to 20 (an example of the first value), to the Q value setting switch 304. The Q value setting switch 304 that has received the setting signal sets the Q value of the antenna 302 to the low Q value (step S201).

Subsequently, the control unit 318 causes the transmitting unit 316 of the communication unit 312 to transmit a charging authentication packet (step S202).

Subsequently, the control unit 318 determines whether the receiving unit 314 of the communication unit 312 has received a response packet for authentication of charging (information about charging of the battery, response signal) from the information processing apparatus 200 or not (step S203). If the receiving unit 314 has not received a response packet for authentication of charging (NO in step S203), the process returns to step S202.

If the receiving unit 314 has received a response packet for authentication of charging (YES in step S203), the control unit 318 determines whether the received response packet is valid or not (step S204). If the received response packet is not valid (NO in step S204), the process returns to step S202.

If the received response packet is valid (YES in step S204), the control unit 318 transmits a setting signal for setting the Q value of the antenna 302 to a Q value higher than the Q value set in step S201, for example, 50 to several hundred (an example of the second value), to the Q value setting switch 304. The Q value setting switch 304 that has received the setting signal sets the Q value of the antenna 302 to the high Q value (step S205).

Subsequently, the control unit 318 waits for a predetermined time period (step S206), and then causes the transmitting unit 310 of the charging unit 306 to transmit power for charging the battery 222 of the information processing apparatus 200 (step S207).

Subsequently, the control unit 318 determines, at predetermined time intervals, whether the receiving unit 308 of the charging unit 306 has received a continue-charging-request packet (information about charging of the battery, charging continuation information) transmitted from the information processing apparatus 200 or not (step S208). If the receiving unit 308 has received a continue-charging-request packet (YES in step S208), charging of the battery 222 of the information processing apparatus 200 has not been completed, and the process returns to step S207.

If the receiving unit 308 has not received a continue-charging-request packet (NO in step S208), charging of the battery 222 of the information processing apparatus 200 has been completed, or the information processing apparatus 200 has been moved to the outside of a communication area of the charging apparatus 300. Thus, the control unit 318 causes the transmitting unit 310 of the charging unit 306 to stop transmitting power (step S209).

Subsequently, the control unit 318 transmits a setting signal for setting the Q value of the antenna 302 to a low Q value to the Q value setting switch 304. The Q value setting switch 304 that has received the setting signal sets the Q value of the antenna 302 to the low Q value (step S210), and the process ends.

According to the first communication/charging process illustrated in FIG. 5, the Q value of the antenna 302 is set to a low Q value when a packet such as a charging authentication packet is transmitted, and the Q value of the antenna 302 is set to a high Q value when power for charging the battery 222 of the information processing apparatus 200 is transmitted. Accordingly, the same effect as that in the first communication/charging process illustrated in FIG. 4 can be obtained.

Specific configuration example of information processing apparatus according to first embodiment.

Next, a specific configuration example of the information processing apparatus 200 according to the first embodiment will be described.

Figure 6:
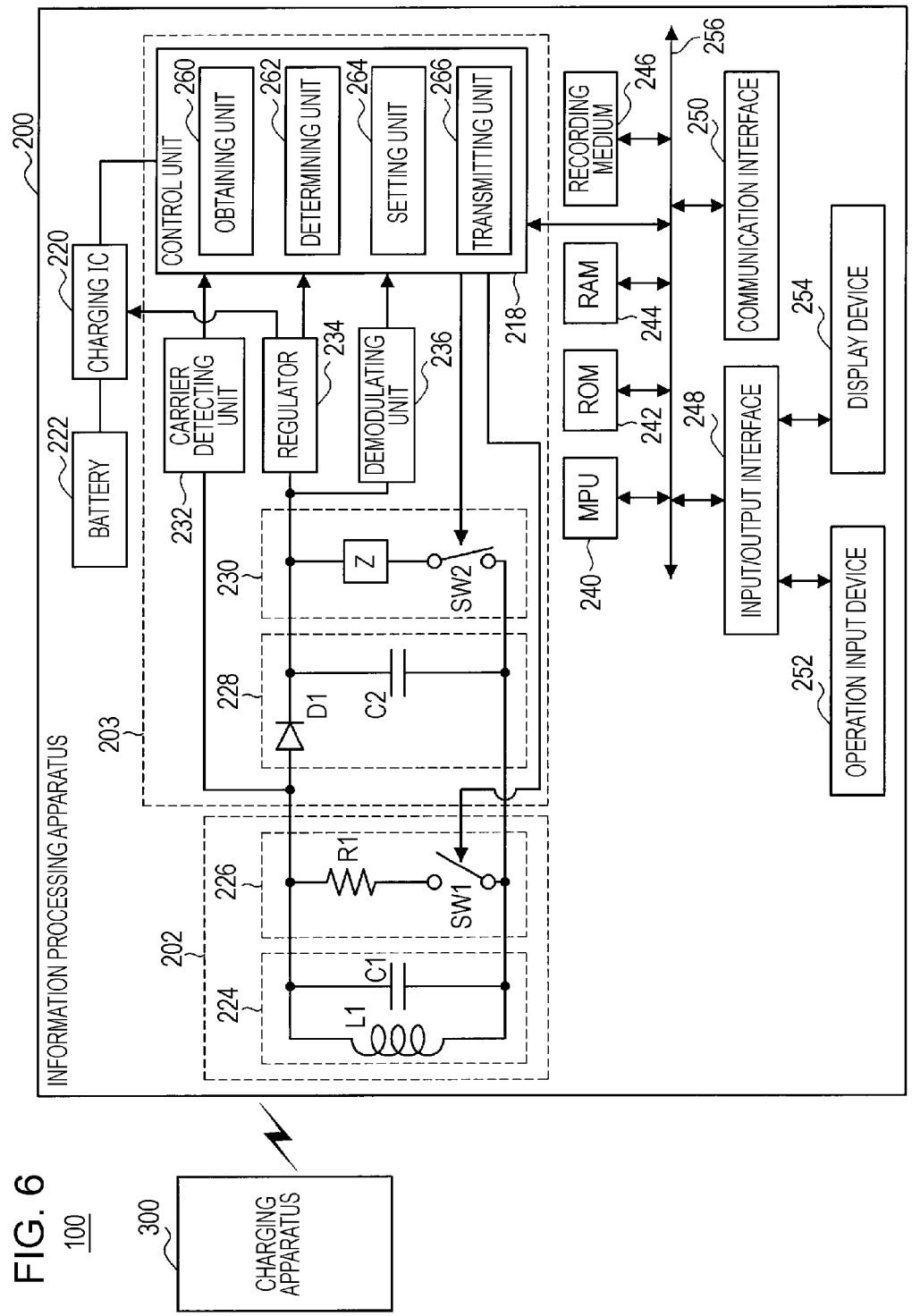
FIG. 6 is a block diagram illustrating a schematic configuration of the information processing system, particularly the information processing apparatus, according to the first embodiment.

FIG. 6 is a block diagram illustrating a schematic configuration of the information processing system 100, particularly the information processing apparatus 200, according to the first embodiment.

Referring to FIG. 6, the information processing apparatus 200 includes the antenna 202, a communication/charging control unit 203, the charging IC 220, the battery 222, a microprocessing unit (MPU) 240, a read only memory (ROM) 242, a random access memory (RAM) 244, a recording medium 246, an input/output interface 248, an operation input device 252, a display device 254, and a communication interface 250. In the information processing apparatus 200, the individual elements are mutually connected via a bus 256 serving as a data transmission path.

The antenna 202 includes a resonance circuit 224 functioning as an antenna and a Q value adjusting circuit 226 serving as the Q value setting switch 204 illustrated in FIG. 2.

The resonance circuit 224 includes a coil (inductor) L1 having a predetermined inductance and a capacitor C1 having a predetermined electrostatic capacity, and generates an induced voltage through electromagnetic induction in accordance with reception of a carrier. Also, the resonance circuit 224 outputs a reception voltage generated by resonating the induced voltage with a predetermined resonance frequency to the communication/charging control unit 203. Here, the resonance frequency in the resonance circuit 224 is set in accordance with the frequency of a carrier, such as 13.56 MHz. By being provided with the resonance circuit 224, the antenna 202 receives a carrier and transmits a response signal through load modulation that is performed by a load modulation unit 230 included in the communication/charging control unit 203.

The Q value adjusting circuit 226 plays a role in adjusting the Q value of the antenna 202. Also, the Q value adjusting circuit 226 is controlled by a setting signal received from the control unit 218 included in the communication/charging control unit 203, which will be described below. In FIG. 6, the Q value of the antenna 202 is adjusted to a low Q value, for example, 10 to 20 (an example of the first value), when a resistor R1 of the Q value adjusting circuit 226 is connected (enabled). That is, when the resistor R1 of the Q value adjusting circuit 226 is not connected (not enabled), the Q value of the antenna 202 is adjusted to a high Q value, for example, 50 to several hundred (an example of the second value). In the example illustrated in FIG. 6, the Q value adjusting circuit 226 includes the resistor R1 and a switching element SW1 that connects (enables) the resistor R1 (load) in accordance with the signal level (high level/low level) of a setting signal received from the control unit 218. Alternatively, the Q value adjusting circuit 226 may have another configuration. For example, the Q value adjusting circuit 226 may include a variable resistor (load) the resistance value of which changes in accordance with a setting signal (e.g., a voltage signal) received thereby. Also, the Q value adjusting circuit 226 may include a plurality of resistors (resistors having different resistances or resistors having same resistances) and a switching element that selectively connects the plurality of resistors (any one or a plurality of resistors). The switching element may include one or more MOSFETs (e.g., p-channel MOSFET and n-channel MOSFET) in which a setting signal is received by a control terminal, but the switching element may have another configuration.

The communication/charging control unit 203 processes a carrier signal by demodulating it on the basis of a carrier received by the antenna 202 and causes a response signal to be transmitted by using load modulation. Also, the communication/charging control unit 203 receives power for charging the battery 222 received by the antenna 202 and causes the charging IC 220 to charge the battery 222.

The communication/charging control unit 203 includes a carrier detecting unit 232, a detector unit 228, a regulator 234, a demodulating unit 236, the control unit 218, and the load modulation unit 230. Alternatively, the communication/charging control unit 203 may further include a protective circuit (not illustrated) for preventing an overvoltage or overcurrent from being applied to the control unit 218. An example of the protective circuit includes a clamp circuit including a diode or the like.

The carrier detecting unit 232 generates a rectangular detection signal on the basis of a reception voltage transmitted from the antenna 202 and transmits the detection signal to the control unit 218.

The detector unit 228 rectifies a reception voltage output from the antenna 202. Here, the detector unit 228 may include a diode D1 and a capacitor C2, but the detector unit 228 may have another configuration. Also, the regulator 234 smoothes the reception voltage to generate a constant voltage and outputs a drive voltage to the control unit 218. Here, the regulator 234 may use a DC component of the reception voltage as a drive voltage. Also, the regulator 234 outputs a voltage for charging the battery 222 to the charging IC 220.

The demodulating unit 236 demodulates a carrier signal on the basis of a reception voltage and outputs data corresponding to the carrier signal contained in a carrier (e.g., binarized data signal of high level and low level). Here, the demodulating unit 236 may output a data signal on the basis of an AC component of the reception voltage.

The control unit 218 is driven with a drive voltage output from the regulator 234 or a drive voltage supplied from the battery 222 serving as a power supply, and performs various processes, such as a process of data (data signal) demodulated by the demodulating unit 236. Here, the control unit 218 may include an MPU or the like, but another configuration is also acceptable.

More specifically, the control unit 218 includes an obtaining unit 260, a determining unit 262, a setting unit 264, and a transmitting unit 266. The obtaining unit 260 includes a charging authentication information obtaining unit (not illustrated) serving as the receiving unit 214 of the communication unit 212 illustrated in FIG. 2 and a remaining power information obtaining unit (not illustrated). The transmitting unit 266 includes a response signal transmitting unit (not illustrated) serving as the transmitting unit 216 of the communication unit 212 illustrated in FIG. 2 and a charging continuation information transmitting unit (not illustrated) serving as the transmitting unit 210 of the charging unit 206 illustrated in FIG. 2.

After the power of the information processing apparatus 200 has been turned on, the setting unit 264 transmits a setting signal for setting the Q value of the antenna 202 to a low Q value, e.g., 10 to 20 (an example of the first value), to the Q value adjusting circuit 226. The charging authentication information obtaining unit of the obtaining unit 260 receives (obtains) a charging authentication packet. When the charging authentication information obtaining unit of the obtaining unit 260 receives the charging authentication packet, the remaining power information obtaining unit of the obtaining unit 260 obtains remaining power information of the battery 222 from the charging IC 220. The determining unit 262 determines whether charging of the battery 222 is necessary or not (whether charging is to be performed or not) on the basis of the remaining power information of the battery 222 obtained by the obtaining unit 260. If charging of the battery 222 is necessary (if charging is to be performed), the response signal transmitting unit of the transmitting unit 266 transmits a response packet for authentication of charging to the charging apparatus 300 by controlling the load modulation unit 230. After that, the setting unit 264 transmits a setting signal for setting the Q value of the antenna 202 to a high Q value, for example, 50 to several hundred (an example of the second value), to the Q value adjusting circuit 226. When the charging IC 220 receives power for charging the battery 222, the control unit 218 causes the charging IC 220 to charge the battery 222. That is, the control unit 218 plays a role of the receiving unit 208 of the charging unit 206 illustrated in FIG. 2. Then, the remaining power information obtaining unit of the obtaining unit 260 obtains remaining power information of the battery 222 from the charging IC 220 at predetermined time intervals during charging of the battery 222. On the basis of the remaining power information of the battery 222 obtained by the obtaining unit 260, the determining unit 262 determines whether charging of the battery 222 is necessary or not (whether charging is to be performed or not). If charging of the battery 222 is necessary (if charging is to be performed), the charging continuation information transmitting unit of the transmitting unit 266 transmits a continue-charging-request packet to the charging apparatus 300 by controlling the load modulation unit 230. In this way, while charging of the battery 222 is necessary, the charging continuation information transmitting unit of the transmitting unit 266 intermittently transmits a continue-charging-request packet to the charging apparatus 300 by controlling the load modulation unit 230. On the other hand, if charging of the battery 222 is not necessary (if charging is not to be performed), the charging continuation information transmitting unit of the transmitting unit 266 does not control the load modulation unit 230 and does not transmit a continue-charging-request packet to the charging apparatus 300. Then, after a predetermined time period has elapsed, the control unit 218 determines whether the charging IC 220 is receiving power for charging the battery 222 or not. If the charging IC 220 is not receiving power for charging the battery 222, the setting unit 264 transmits a setting signal for setting the Q value of the antenna 202 to a low Q value to the Q value adjusting circuit 226.

The load modulation unit 230 includes a load Z and a switching element SW2, for example, and performs load modulation by selectively connecting (enabling) the load Z in accordance with a control signal received from the control unit 218. Here, the load Z is configured using a resistor having a predetermined resistance value, but the load Z may have another configuration. Also, the switching element SW2 is configured using a p-channel MOSFET or an n-channel MOSFET, but the switching element SW2 may have another configuration.

With the load modulation performed by the load modulation unit 230, the impedance of the information processing apparatus 200 viewed from the charging apparatus 300 changes.

With the above-described configuration of the communication/charging control unit 203, the Q value of the antenna 202 is set to a low Q value when a packet such as a charging authentication packet is received from the charging apparatus 300, and the Q value of the antenna 202 is set to a high Q value when power for charging the battery 222 is received from the charging apparatus 300. When the Q value of the antenna 202 is low, the bandwidth is wide and thus data transmission can be efficiently performed. When the Q value of the antenna 202 is high, the amplitude of a carrier can be increased and thus reception of charging power can be efficiently performed.

Accordingly, noncontact communication and noncontact charging can be efficiently performed by using the single antenna.

The battery 222 is an internal power supply included in the information processing apparatus 200 and supplies a drive voltage to each unit of the information processing apparatus 200. In FIG. 6, the voltage output from the battery 222 is supplied to the control unit 218 via the charging IC 220 for convenience of the description, but the voltage may be supplied in another way. Here, an example of the battery 222 includes a secondary battery, such as a lithium-ion rechargeable battery. The charging IC 220 controls charging of the battery 222.

The MPU 240 functions as a control unit that controls the entire information processing apparatus 200. The ROM 242 stores data for control, such as programs and computation parameters used by the MPU 240. The RAM 244 temporarily stores a program executed by the MPU 240.

The recording medium 246 functions as a storage unit of the information processing apparatus 200 and stores various applications, for example. Here, examples of the recording medium 246 include a magnetic recording medium, such as a hard disk, and a nonvolatile memory, such as an electrically erasable and programmable read only memory (EEPROM), a flash memory, a magnetic random access memory (MRAM), a ferroelectric random access memory (FeRAM), and a phase change random access memory (PRAM).

The input/output interface 248 connects the operation input device 252 and the display device 254, for example. Here, examples of the input/output interface 248 include a universal serial bus (USB) terminal, a digital visual interface (DVI) terminal, and a high-definition multimedia interface (HDMI) terminal. The operation input device 252 includes a button, a direction key, a rotary selector such as a jog dial, or a combination of those components, is provided on the information processing apparatus 200, and is connected to the input/output interface 248 inside the information processing apparatus 200. The display device 254 includes a liquid crystal display (LCD) or an organic electroluminescence (EL) display (also called an organic light-emitting diode (OLED) display), is provided on the information processing apparatus 200, and is connected to the input/output interface 248 inside the information processing apparatus 200. Of course, the input/output interface 248 can be connected to operation input devices (e.g., a keyboard and a mouse) and a display device (e.g., an external display) serving as external devices of the information processing apparatus 200.

The communication interface 250 is a communication unit of the information processing apparatus 200 and functions as a communication unit for communicating with an external apparatus, such as a server, via a network (or directly) in a wireless/wired manner. Here, examples of the network include a wired network such as a local area network (LAN) or a wide area network (WAN), a wireless network such as a wireless wide area network (WWAN) or a wireless metropolitan area network (WMAN) via a base station, and the Internet using a communication protocol such as a transmission control protocol/Internet protocol (TCP/IP). Examples of the communication interface 250 include a communication antenna and an RF circuit (wireless communication), an IEEE802.15.1 port and a transmission/reception circuit (wireless communication), an IEEE802.11b port and a transmission/reception circuit (wireless communication), and a LAN terminal and a transmission/reception circuit (wired communication). For example, the communication interface 250 may have a configuration compatible with the above-described networks.

Specific configuration example of charging apparatus according to first embodiment.

Next, a specific configuration example of the charging apparatus 300 according to the first embodiment will be described.

Figure 7:
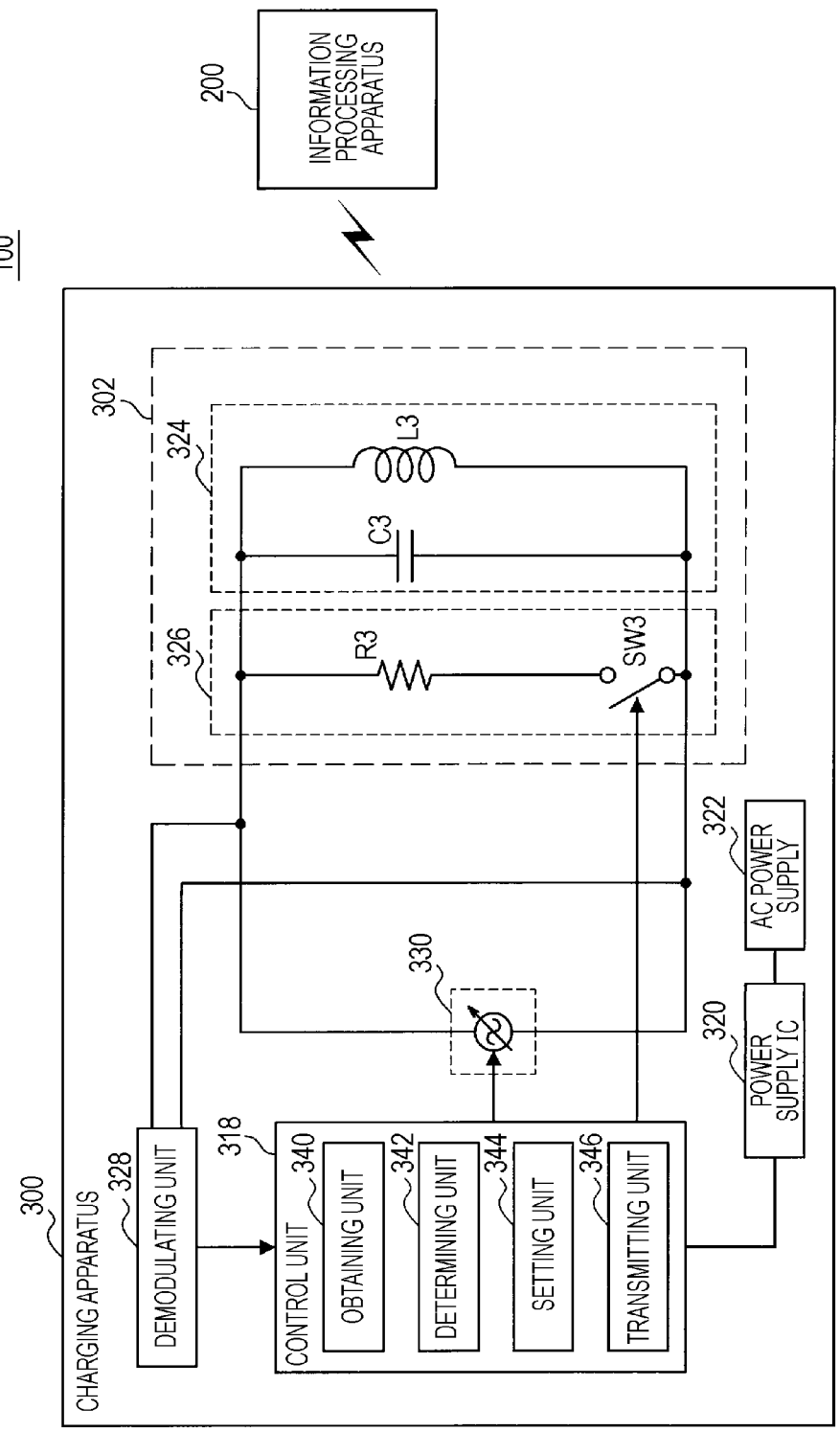
FIG. 7 is a block diagram illustrating a schematic configuration of the information processing system, particularly the charging apparatus, according to the first embodiment.

FIG. 7 is a block diagram illustrating a schematic configuration of the information processing system 100, particularly the charging apparatus 300, according to the first embodiment.

Referring to FIG. 7, the charging apparatus 300 includes a carrier signal generating unit 330, the antenna 302, a demodulating unit 328, and the control unit 318. In the charging apparatus 300, a rectifier circuit (not illustrated) may be provided between the antenna 302 and the demodulating unit 328.

Also, the charging apparatus 300 may include a ROM (not illustrated), a RAM (not illustrated), a storage unit (not illustrated), and an interface (not illustrated) for connecting the charging apparatus 300 to an external apparatus (not illustrated) or a circuit. In the charging apparatus 300, the individual elements can be mutually connected via a bus serving as a data transmission path. The ROM stores programs, computation parameters, and data for control used by the control unit 318. The RAM temporarily stores a program executed by the control unit 318. The storage unit (not illustrated) stores applications and data used in the charging apparatus 300. Here, examples of the storage unit (not illustrated) include a magnetic recording medium such as a hard disk and a nonvolatile memory such as a flash memory. Examples of the interface (not illustrated) include a universal asynchronous receiver transmitter (UART) and a network terminal.

The carrier signal generating unit 330 is controlled by the control unit 318 and generates a carrier signal in response to a carrier signal generation instruction received from the control unit 318, for example. In FIG. 7, an AC power supply is illustrated as the carrier signal generating unit 330, but the carrier signal generating unit 330 may have another configuration. For example, the carrier signal generating unit 330 may further include a modulation circuit (not illustrated) that performs amplitude shift keying (ASK) modulation. Various processing instructions for the information processing apparatus 200 and data to be processed may be contained in the carrier signal generated by the carrier signal generating unit 330, for example.

The antenna 302 includes a resonance circuit 324 functioning as an antenna and a Q value adjusting circuit 326 serving as the Q value setting switch 304 illustrated in FIG. 3. The antenna 302 transmits a carrier in accordance with a carrier signal generated by the carrier signal generating unit 330, and receives a response signal from the information processing apparatus 200.

Here, the resonance circuit 324 includes a coil (inductor) L3 having a predetermined inductance for functioning as an antenna and a capacitor C3 having a predetermined electrostatic capacity. The resonance frequency of the resonance circuit 324 is set in accordance with the frequency of a carrier, such as 13.56 MHz.

The Q value adjusting circuit 326 is controlled by the control unit 318 and adjusts the Q value of the antenna 302 in accordance with a setting signal received from the control unit 318. In FIG. 7, the Q value of the antenna 302 is adjusted to a low Q value, for example, 10 to 20 (an example of the first value), when a resistor R3 of the Q value adjusting circuit 326 is connected (enabled). That is, when the resistor R3 of the Q value adjusting circuit 326 is not connected (not enabled), the Q value of the antenna 302 is adjusted to a high Q value, for example, 50 to several hundred (an example of the second value). In the example illustrated in FIG. 7, the Q value adjusting circuit 326 includes the resistor R3 and a switching element SW3, but the Q value adjusting circuit 326 may have other various configurations.

The demodulating unit 328 demodulates a response signal transmitted from the information processing apparatus 200 by performing envelope detection on a change of amplitude of the voltage at the end of the antenna 302 and by binarizing a detected signal.

The control unit 318 is configured using an MPU or an integrated circuit in which various processing circuits are integrated, controls the entire charging apparatus 300, and performs various processes. Also, the control unit 318 includes an obtaining unit 340, a determining unit 342, a setting unit 344, and a transmitting unit 346. The obtaining unit 340 includes a response signal obtaining unit (not illustrated) serving as the receiving unit 314 of the communication unit 312 illustrated in FIG. 3 and a charging continuation information obtaining unit (not illustrated) serving as the receiving unit 308 of the charging unit 306 illustrated in FIG. 3. The transmitting unit 346 includes a power transmitting unit (not illustrated) serving as the transmitting unit 310 of the charging unit 306 illustrated in FIG. 3 and a power transmission stop unit (not illustrated).

After the power of the charging apparatus 300 has been turned on, the setting unit 344 transmits a setting signal for setting the Q value of the antenna 302 to a low Q value, for example, 10 to 20 (an example of the first value), to the Q value adjusting circuit 326. The control unit 318 controls the carrier signal generating unit 330 to transmit a charging authentication packet. That is, the control unit 318 plays a role of the transmitting unit 316 of the communication unit 312 illustrated in FIG. 3. After that, when the response signal obtaining unit of the obtaining unit 340 receives a response packet for authentication of charging, the control unit 318 determines whether the received response packet is valid or not. If the response packet is valid, the determining unit 342 determines that charging of the battery 222 of the information processing apparatus 200 is necessary (charging is to be performed), and the setting unit 344 transmits a setting signal for setting the Q value of the antenna 302 to a high Q value, for example, 50 to several hundred (an example of the second value), to the Q value adjusting circuit 326. Then, after a predetermined time period has elapsed, the power transmitting unit of the transmitting unit 346 controls the carrier signal generating unit 330 to transmit power for charging the battery 222 of the information processing apparatus 200. After that, the control unit 318 determines, at predetermined time intervals, whether the charging continuation information obtaining unit of the obtaining unit 340 has received a continue-charging-request packet or not. If the charging continuation information obtaining unit of the obtaining unit 340 has received a continue-charging-request packet, the power transmitting unit of the transmitting unit 346 controls the carrier signal generating unit 330 to continue transmission of charging power. On the other hand, if the charging continuation information obtaining unit of the obtaining unit 340 has not received a continue-charging-request packet, the power transmission stop unit of the transmitting unit 346 controls the carrier signal generating unit 330 to stop transmitting charging power. Then, the setting unit 344 transmits a setting signal for setting the Q value of the antenna 302 to a low Q value to the Q value adjusting circuit 326.

With the above-described configuration of the charging apparatus 300, the Q value of the antenna 302 is set to a low Q value when a packet such as a charging authentication packet is transmitted, and the Q value of the antenna 302 is set to a high Q value when power for charging the battery 222 of the information processing apparatus 200 is transmitted. When the Q value of the antenna 302 is low, the bandwidth is wide and thus data transmission can be efficiently performed. When the Q value of the antenna 302 is high, the amplitude of a carrier can be increased and thus transmission of charging power can be efficiently performed. Accordingly, noncontact communication and noncontact charging can be efficiently performed by using the single antenna.

Figure 8:
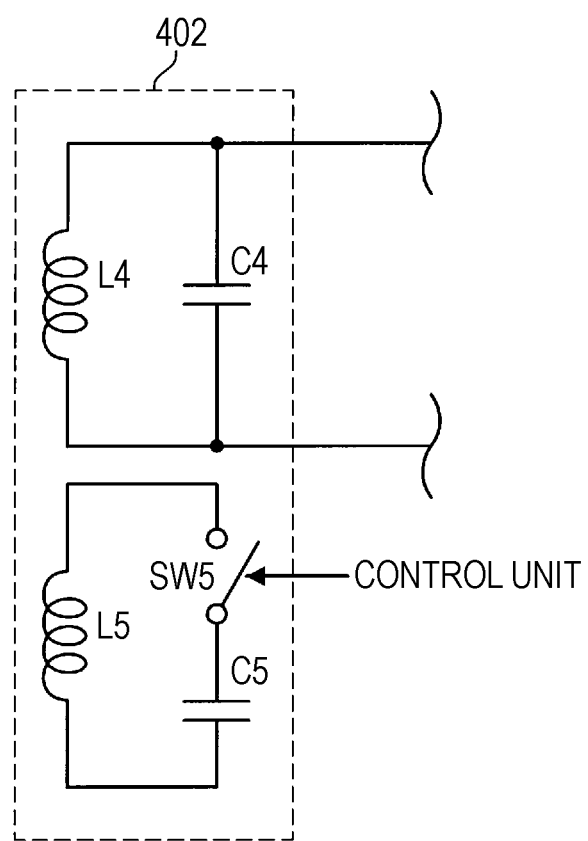
FIG. 8 is a circuit diagram illustrating a modification of an antenna included in the information processing apparatus or the charging apparatus according to the first embodiment.

Each of the above-described antennas 202 and 302 includes a resonance circuit having a coil and a capacitor and a Q value adjusting circuit having a resistor and a switching element. Alternatively, the antenna 402 illustrated in FIG. 8 may be used. The antenna 402 includes a resonance circuit having a coil L4 and a capacitor C4 and a Q value adjusting circuit that is placed near the resonance circuit and that has a coil L5, a capacitor C5, and a switching element SW5. With this configuration, the Q value of the antenna 402 can be set to a Q value higher than that of the antennas 202 and 302, so that transmission of power can be performed more efficiently.

A description has been given above about the information processing apparatus 200, which is an element constituting the information processing system 100 according to the first embodiment of the invention, but the first embodiment of the invention is not limited to the foregoing form. The first embodiment of the invention can be applied to various apparatuses, such as a mobile communication apparatus having a reader/writer function (i.e., a function of mainly transmitting a carrier), and a computer such as a personal computer (PC) having a reader/writer function.

Also, a description has been given above about the charging apparatus 300, which is an element constituting the information processing system 100 according to the first embodiment of the invention, but the first embodiment of the invention is not limited to the foregoing form. The first embodiment of the invention can be applied to various apparatuses capable of communicating with the information processing apparatus 200 in a noncontact manner, such as a charging apparatus having a reader/writer function.

Figure 9:
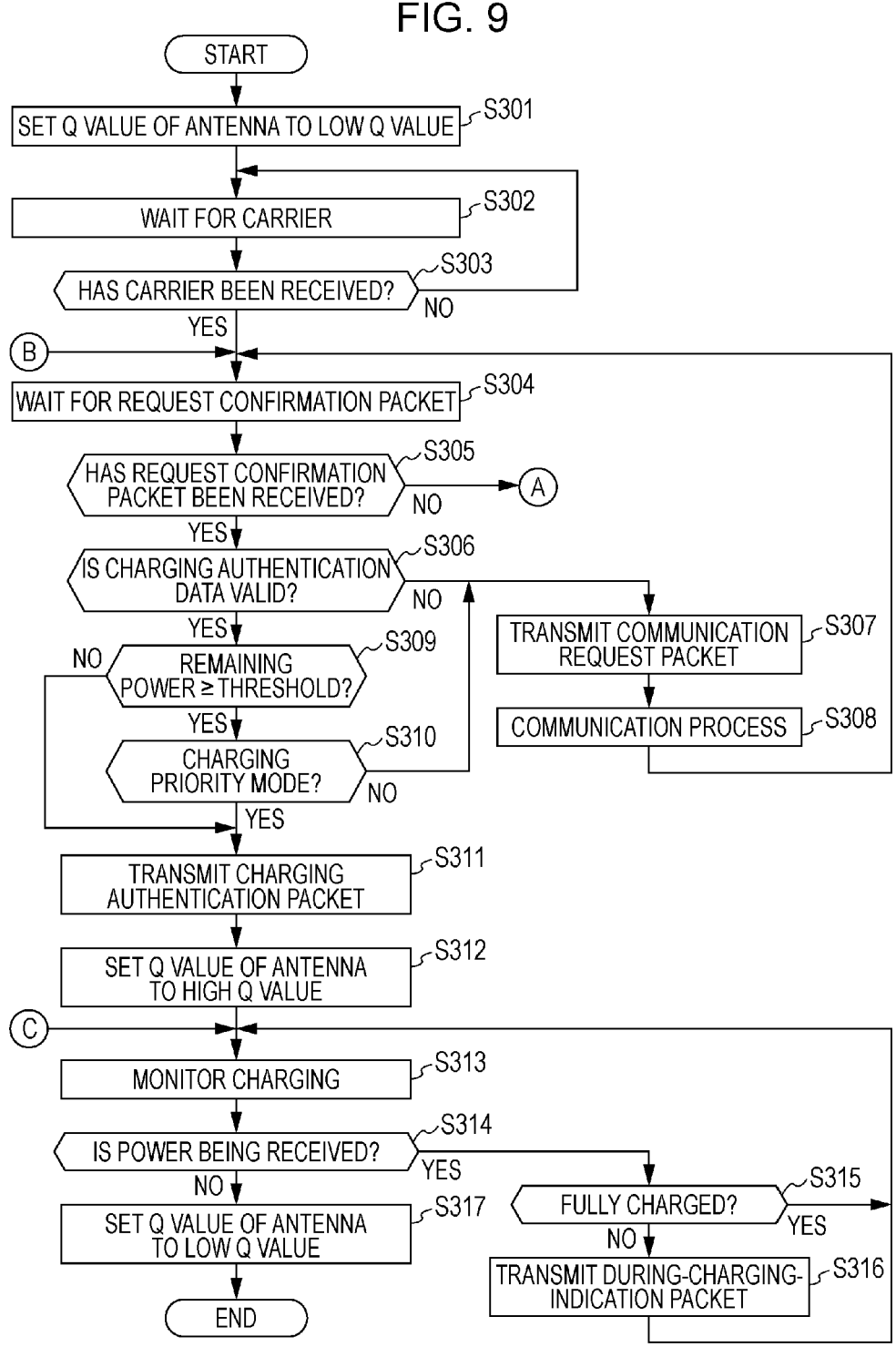
FIG. 9 is a flowchart of a second communication/charging process performed by the information processing apparatus according to the first embodiment.
Figure 10:
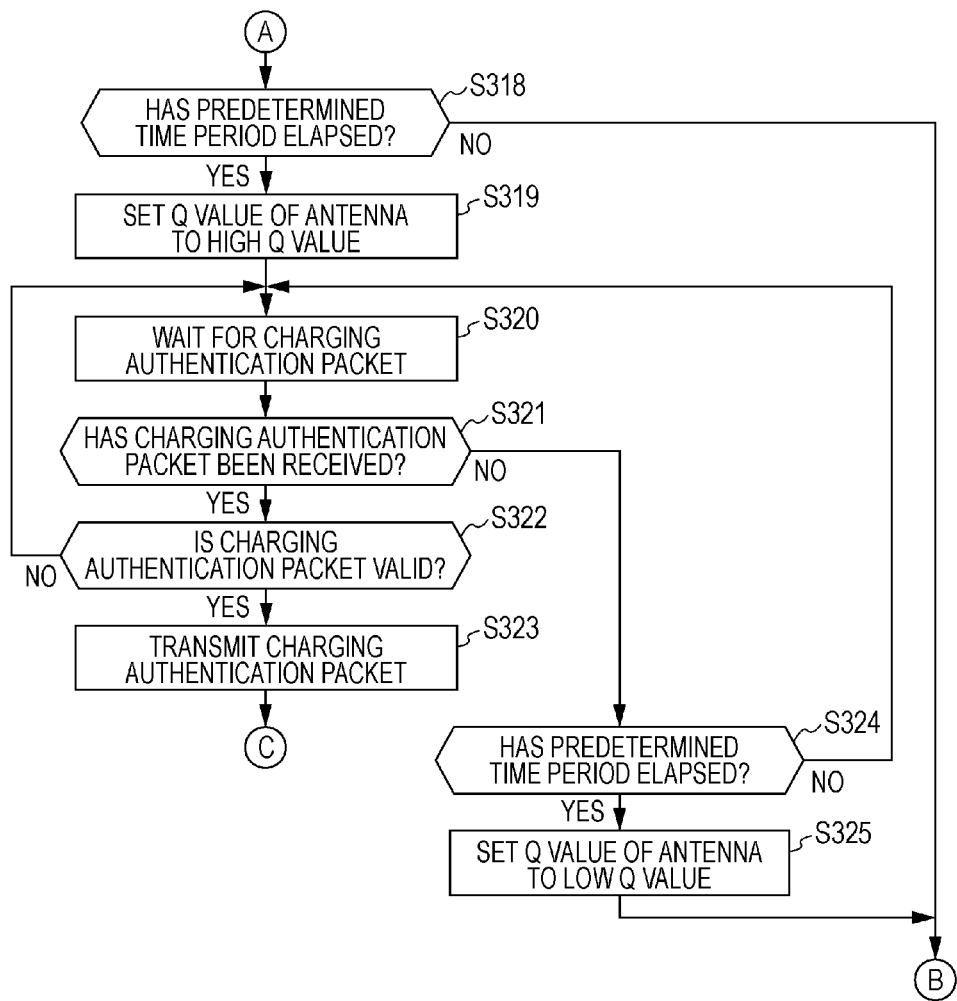
FIG. 10 is a flowchart of the second communication/charging process continued from the flowchart in FIG. 9.

Second Communication/Charging Process Performed by Information Processing Apparatus According to first embodiment Hereinafter, a second communication/charging process performed by the information processing apparatus 200 according to the first embodiment will be described. FIG. 9 is a flowchart of the second communication/charging process performed by the information processing apparatus 200 according to the first embodiment of the invention. FIG. 10 is a flowchart continued from the flowchart illustrated in FIG. 9.

Referring to FIG. 9, after the power of the information processing apparatus 200 has been turned on, the control unit 218 of the information processing apparatus 200 transmits a setting signal for setting the Q value of the antenna 202 to a low Q value, for example, 10 to 20 (an example of the first value), to the Q value setting switch 204. The Q value setting switch 204 that has received the setting signal sets the Q value of the antenna 202 to the low Q value (step S301).

Subsequently, the control unit 218 causes the receiving unit 214 of the communication unit 212 to wait for a carrier, for example, a carrier of 13.56 MHz, transmitted from the charging apparatus 300 (step S302).

Subsequently, the control unit 218 determines whether the receiving unit 214 has received a carrier or not (step S303). If the receiving unit 214 has not received a carrier (NO in step S303), the process returns to step S302.

If it is determined in step S303 that the receiving unit 214 has received a carrier (YES in step S303), the control unit 218 waits for a request confirmation packet transmitted from the charging apparatus 300 (step S304). If the reception of the carrier interrupts during waiting for a request confirmation packet in step S304, the process returns to step S302.

Subsequently, the control unit 218 determines whether the receiving unit 214 has received a request confirmation packet or not (step S305). For example, as illustrated in FIG. 29A, a request confirmation packet 10 transmitted from the charging apparatus 300 having a noncontact communication function and a noncontact charging function includes a preamble 12, data 14, charging function presence/absence determination data 16 serving as charging authentication data, and data 18.

If it is determined in step S305 that the receiving unit 214 has received a request confirmation packet (YES in step S305), the control unit 218 determines whether charging authentication data contained in the received request confirmation packet is valid or not (step S306).

If it is determined in step S306 that the charging authentication data is not valid (NO in step S306), the request is a normal communication request. Thus, the control unit 218 causes the transmitting unit 216 to transmit a communication request packet to the charging apparatus 300 (step S307) and performs a normal communication process with the charging apparatus 300 (step S308), and the process returns to step S304.

If it is determined in step S306 that the charging authentication data is valid (YES in step S306), the control unit 218 obtains remaining power information of the battery 222 from the charging IC 220, and determines whether the remaining power of the battery 222 is equal to or higher than a threshold or not on the basis of the obtained remaining power information of the battery 222 (step S309).

If it is determined in step S309 that the remaining power of the battery 222 is equal to or higher than the threshold (YES in step S309), the control unit 218 determines whether a charging priority mode is set in the information processing apparatus 200 or not (step S310), higher priority being put on charging than communication in the charging priority mode. Here, the charging priority mode may be set by a user, or by the control unit 218 on the basis of the status of the information processing apparatus 200.

If it is determined in step S310 that the charging priority mode is not set (NO in step S310), higher priority is put on communication and thus the process proceeds to step S307.

If it is determined in step S309 that the remaining power of the battery 222 is lower than the threshold (NO in step S309), or if it is determined in step S310 that the charging priority mode is set (YES in step S310), the control unit 218 causes the transmitting unit 216 to transmit a charging authentication packet to the charging apparatus 300 (step S311). As illustrated in FIG. 29B, a charging authentication packet 20 transmitted by the information processing apparatus 200 having a noncontact communication function and a noncontact charging function includes a preamble 22, data 24, charging function presence/absence data 26 serving as charging authentication data, and data 28. In addition, as illustrated in FIG. 29C, a charging authentication packet 30 transmitted by an information processing apparatus 800 illustrated in FIG. 24 (described below) that has a noncontact communication function and that does not have a noncontact charging function includes a preamble 32, data 34, charging function presence/absence data 36 serving as charging authentication data, and data 38. Also, as illustrated in FIG. 29D, another charging authentication packet 40 transmitted by the information processing apparatus 800 illustrated in FIG. 24 that has a noncontact communication function and that does not have a noncontact charging function includes a preamble 42 and data 44.

The charging apparatus 300 that has received the charging authentication packet transmitted in step S311 starts transmitting power for charging the battery 222 of the information processing apparatus 200 after a predetermined time period has elapsed. Thus, the control unit 218 transmits a setting signal for setting the Q value of the antenna 202 to a Q value higher than the Q value set in step S301, for example, 50 to several hundred (an example of the second value), to the Q value setting switch 204. The Q value setting switch 204 that has received the setting signal sets the Q value of the antenna 202 to the high Q value (step S312).

Subsequently, the control unit 218 monitors charging of the battery 222 (step S313).

Subsequently, the control unit 218 determines whether the receiving unit 208 of the charging unit 206 is receiving power for charging the battery 222 or not (step S314).

If it is determined in step S314 that the receiving unit 208 is receiving charging power (YES in step S314), the control unit 218 obtains remaining power information of the battery 222 from the charging IC 220 and determines whether the battery 222 is fully charged or not (step S315).

If it is determined in step S315 that the battery 222 is not fully charged (NO in step S315), the control unit 218 causes the transmitting unit 210 of the charging unit 206 to transmit a during-charging-indication packet to the charging apparatus 300 (step S316), and the process returns to step S313. In step S316, communication is performed at a sufficiently-low data transmission rate so that communication can be performed even if the Q value of the antenna 202 is high.

If it is determined in step S315 that the battery 222 is fully charged (YES in step S315), the control unit 218 does not cause the transmitting unit 210 of the charging unit 206 to transmit a during-charging-indication packet to the charging apparatus 300, and the process returns to step S313.

If it is determined in step S314 that the receiving unit 208 is not receiving charging power, that is, if reception of power from the charging apparatus 300 stops because the control unit 218 does not cause the transmitting unit 210 of the charging unit 206 to transmit a during-charging-indication packet, or if the information processing apparatus 200 has been moved to the outside of a communication area of the charging apparatus 300 (NO in step S314), the control unit 218 transmits a setting signal for setting the Q value of the antenna 202 to a low Q value to the Q value setting switch 204, and the Q value setting switch 204 that has received the setting signal sets the Q value of the antenna 202 to the low Q value (step S317). Then, the process ends.

On the other hand, if it is determined in step S305 that the receiving unit 214 of the communication unit 212 has not received a request confirmation packet (NO in step S305), the process proceeds to step S318 in FIG. 10, where the control unit 218 determines whether a predetermined time period has elapsed from the waiting for a request confirmation packet in step S304 or not.

If it is determined in step S318 that the predetermined time period has not elapsed (NO in step S318), the process returns to step S304 in FIG. 9.

If it is determined in step S318 that the predetermined time period has elapsed (YES in step S318), the control unit 218 assumes that a charging apparatus that has a noncontact charging function and that does not have a noncontact communication function, for example, the charging apparatus 700 illustrated in FIG. 19 described below, exists near the information processing apparatus 200, and transmits a setting signal for setting the Q value of the antenna 202 to a Q value higher than the Q value set in step S301, for example, 50 to several hundred (an example of the second value), to the Q value setting switch 204. The Q value setting switch 204 that has received the setting signal sets the Q value of the antenna 202 to the high Q value (step S319).

Subsequently, the control unit 218 waits for a charging authentication packet transmitted from the charging apparatus 700 illustrated in FIG. 19 (step S320). In step S320, the charging apparatus 700 illustrated in FIG. 19 performs communication at a sufficiently-low data transmission rate so that communication can be performed even if the Q value of the antenna 202 is high.

Figure 30A:
FIGS. 30A and 30B illustrate configurations of charging authentication packets.

Subsequently, the control unit 218 determines whether the receiving unit 208 of the charging unit 206 has received a charging authentication packet or not (step S321). As illustrated in FIG. 30A, a charging authentication packet 50 transmitted from the charging apparatus 700 illustrated in FIG. 19 includes a preamble 52 and charging authentication data 54.

If it is determined in step S321 that the receiving unit 208 has received a charging authentication packet (YES in step S321), the control unit 218 determines whether the received charging authentication packet is valid or not (step S322). If the charging authentication packet is not valid (NO in step S322), the process returns to step S320.

Figure 19:
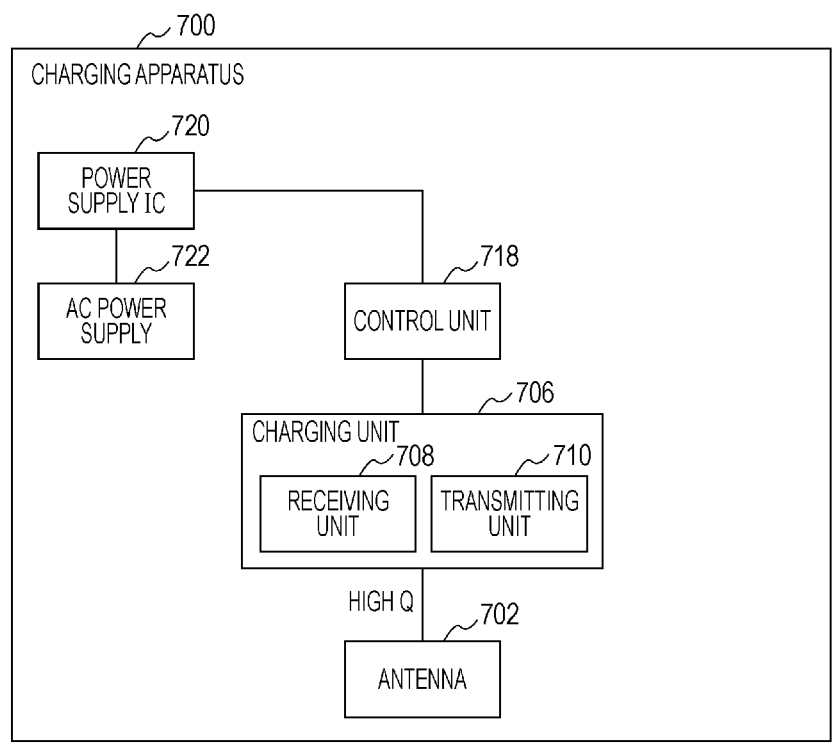
FIG. 19 is a block diagram illustrating a schematic configuration of a charging apparatus according to the third embodiment.
Figure 30B:

If it is determined in step S322 that the charging authentication packet is valid (YES in step S322), the control unit 218 causes the transmitting unit 210 of the charging unit 206 to transmit a charging authentication packet to the charging apparatus 700 illustrated in FIG. 19 (step S323), and the process proceeds to step S313 in FIG. 9. As illustrated in FIG. 30B, a charging authentication packet 60 transmitted by the information processing apparatus 200 in step S323 includes a preamble 62 and charging authentication return data 64.

On the other hand, if it is determined in step S321 that the receiving unit 208 has not received a charging authentication packet (NO in step S321), the control unit 218 determines whether a predetermined time period has elapsed from the waiting for a charging authentication packet in step S320 or not (step S324).

If it is determined in step S324 that the predetermined time period has not elapsed (NO in step S324), the process returns to step S320.

If it is determined in step S324 that the predetermined time period has elapsed (YES in step S324), the control unit 218 transmits a setting signal for setting the Q value of the antenna 202 to a low Q value, for example, 10 to 20 (an example of the first value), to the Q value setting switch 204. The Q value setting switch 204 that has received the setting signal sets the Q value of the antenna 202 to a low Q value (step S325). Then, the process returns to step S304 in FIG. 9.

According to the second communication/charging process illustrated in FIGS. 9 and 10, the Q value of the antenna 202 is set to a low Q value when a packet such as a request confirmation packet is received from the charging apparatus 300, and the Q value of the antenna 202 is set to a high Q value when power for charging the battery 222 is received from the charging apparatus 300. When the Q value of the antenna 202 is low, the bandwidth is wide and thus data transmission can be efficiently performed. When the Q value of the antenna 202 is high, the amplitude of a carrier can be increased and thus reception of charging power can be efficiently performed. Accordingly, noncontact communication and noncontact charging can be efficiently performed by using the single antenna.

Furthermore, in a case where the charging apparatus 700 illustrated in FIG. 19 that has a noncontact charging function and that does not have a noncontact communication function exists near the information processing apparatus 200, the Q value of the antenna 202 is set to a high Q value when power for charging the battery 222 is received from the charging apparatus 700. Thus, even in the case where the charging apparatus 700 exists near the information processing apparatus 200, noncontact charging can be efficiently performed by using the single antenna.

Figure 11:
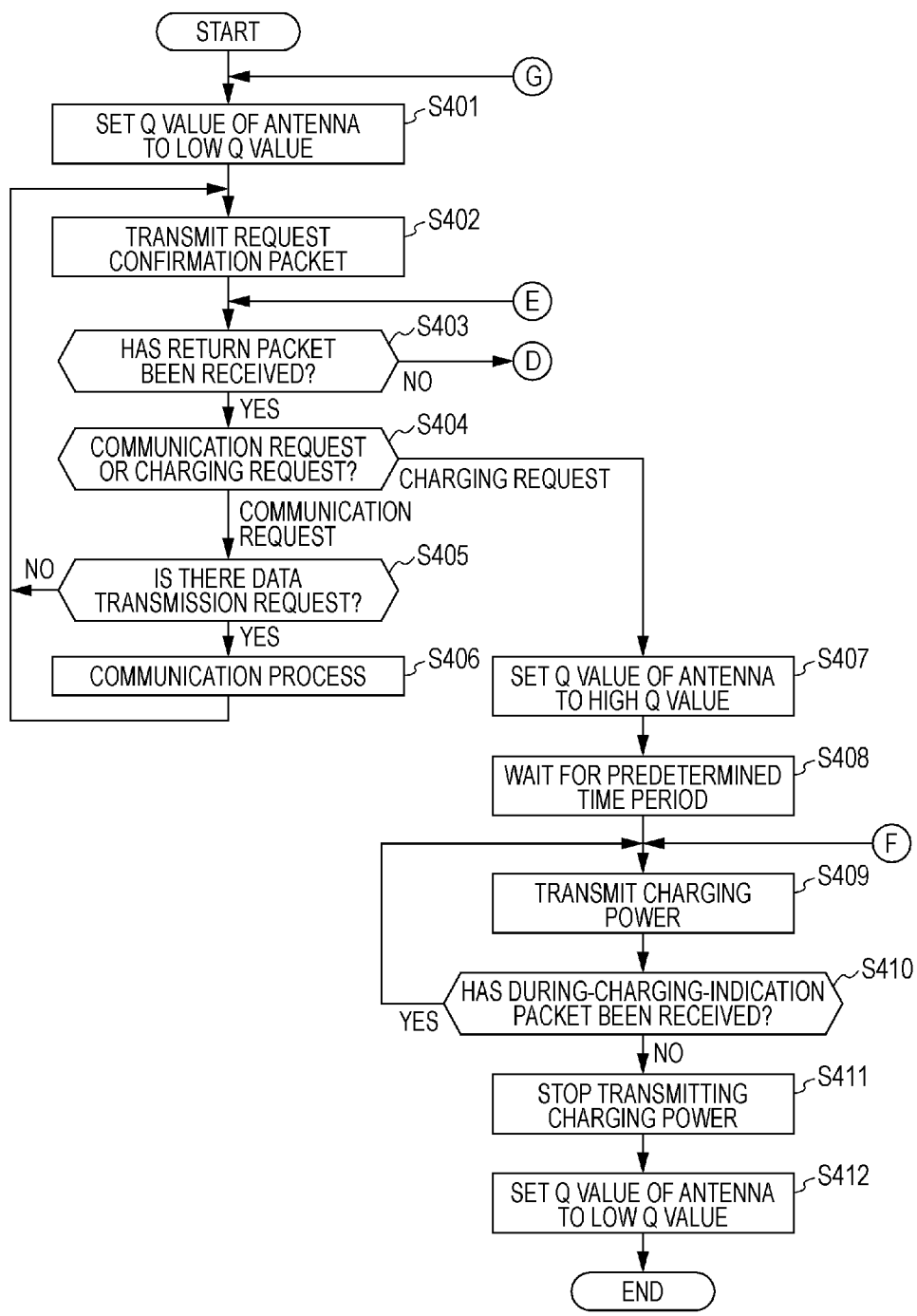
FIG. 11 is a flowchart of a second communication/charging process performed by the charging apparatus according to the first embodiment.
Figure 12:
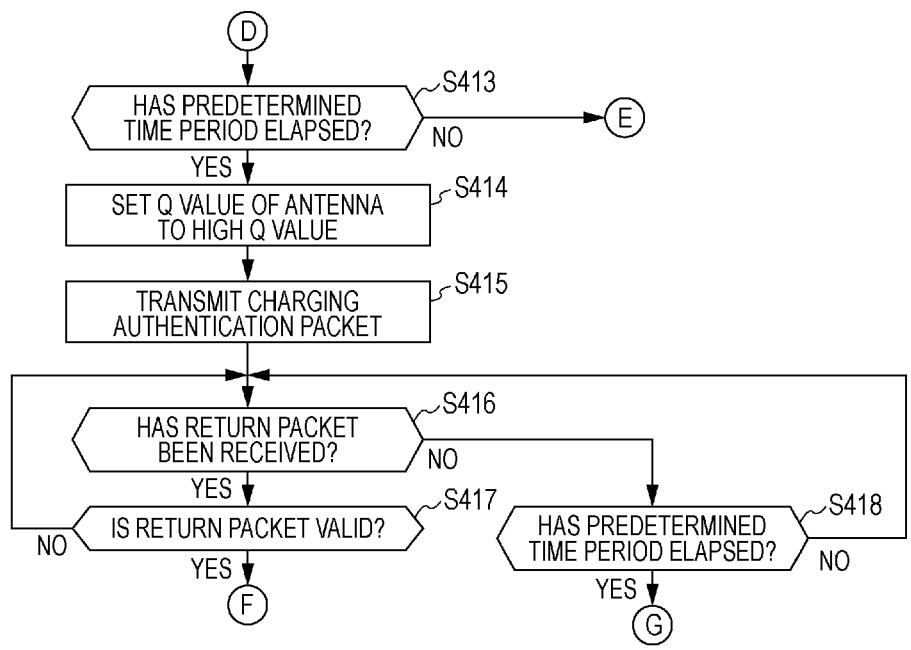
FIG. 12 is a flowchart of the second communication/charging process continued from the flowchart in FIG. 11.

Second Communication/Charging Process Performed by Charging Apparatus According to first embodiment Next, a second communication/charging process performed by the charging apparatus 300 according to the first embodiment of the invention will be described. FIG. 11 is a flowchart of the second communication/charging process performed by the charging apparatus 300 according to the first embodiment of the invention. FIG. 12 is a flowchart continued from the flowchart illustrated in FIG. 11.

Referring to FIG. 11, after the power of the charging apparatus 300 has been turned on, the control unit 318 of the charging apparatus 300 transmits a setting signal for setting the Q value of the antenna 302 to a low Q value, for example, 10 to 20 (an example of the first value), to the Q value setting switch 304. The Q value setting switch 304 that has received the setting signal sets the Q value of the antenna 302 to the low Q value (step S401).

Subsequently, the control unit 318 causes the transmitting unit 316 of the communication unit 312 to transmit a request confirmation packet, for example, the packet illustrated in FIG. 29A (step S402).

Subsequently, the control unit 318 determines whether the receiving unit 314 has received a return packet or not (step S403).

If it is determined in step S403 that the receiving unit 314 has received a return packet (YES in step S403), the control unit 318 determines whether the content of the return packet is a communication request or a charging request (step S404).

If it is determined in step S404 that the content of the return packet is a communication request (communication request in step S404), the control unit 318 determines whether the charging apparatus 300 has a data transmission request or not (step S405). If the charging apparatus 300 does not have a data transmission request (NO in step S405), the process returns to step S402.

If it is determined in step S405 that the charging apparatus 300 has a data transmission request (YES in step S405), the control unit performs a normal communication process (step S406) and the process returns to step S402.

If it is determined in step S404 that the content of the return packet is a charging request (charging request in step S404), the control unit 318 transmits a setting signal for setting the Q value of the antenna 302 to a Q value higher than the Q value set in step S401, for example, 50 to several hundred (an example of the second value), to the Q value setting switch 304. The Q value setting switch 304 that has received the setting signal sets the Q value of the antenna 302 to the high Q value (step S407).

Subsequently, the control unit 318 waits for a predetermined time period (step S408) and then causes the transmitting unit 310 of the charging unit 306 to transmit power for charging the battery 222 of the information processing apparatus 200 (step S409).

Subsequently, the control unit 318 determines, at predetermined time intervals, whether the receiving unit 308 of the charging unit 306 has received a during-charging-indication packet transmitted from the information processing apparatus 200 or not (step S410).

If it is determined in step S410 that the receiving unit 308 has received a during-charging-indication packet (YES in step S410), charging of the battery 222 of the information processing apparatus 200 has not been completed, and thus the process returns to step S409.

If it is determined in step S410 that the receiving unit 308 has not received a during-charging-indication packet (NO in step S410), charging of the battery 222 of the information processing apparatus 200 has been completed, or the information processing apparatus 200 has been moved to the outside of a communication area of the charging apparatus 300. Thus, the control unit 318 causes the transmitting unit 310 of the charging unit 306 to stop transmitting charging power (step S411).

Subsequently, the control unit 318 transmits a setting signal for setting the Q value of the antenna 302 to a low Q value to the Q value setting switch 304. The Q value setting switch 304 that has received the setting signal sets the Q value of the antenna 302 to a low Q value (step S412), and the process ends.

On the other hand, if it is determined in step S403 that the receiving unit 314 has not received a return packet (NO in step S403), the process proceeds to step S413 in FIG. 12, where the control unit 318 determines whether a predetermined time period has elapsed from the transmission of the request confirmation packet in step S402 or not.

If it is determined in step S413 that the predetermined time period has not elapsed (NO in step S413), the process returns to step S403 in FIG. 11.

If it is determined in step S413 that the predetermined time period has elapsed (YES in step S413), the control unit 318 assumes that an information processing apparatus that has a noncontact charging function and that does not have a noncontact communication function, for example, an information processing apparatus 900 illustrated in FIG. 27 described below, exists near the charging apparatus 300, and transmits a setting signal for setting the Q value of the antenna 302 to a Q value higher than the Q value set in step S401, for example, 50 to several hundred (an example of the second value), to the Q value setting switch 304. The Q value setting switch 304 that has received the setting signal sets the Q value of the antenna 302 to the high Q value (step S414).

Subsequently, the control unit 318 causes the transmitting unit 310 of the charging unit 306 to transmit a charging authentication packet (step S415). In step S415, the charging apparatus 300 performs communication at a sufficiently-low data transmission rate so that communication can be performed even if the Q value of the antenna 302 is high.

Subsequently, the control unit 318 determines whether the receiving unit 308 of the charging unit 306 has received a return packet or not (step S416).

If it is determined in step S416 that the receiving unit 308 has received a return packet (YES in step S416), the control unit 318 determines whether the received return packet is valid or not (step S417). If the return packet is not valid (NO in step S417), the process returns to step S416.

If it is determined in step S417 that the return packet is valid (YES in step S417), the process proceeds to step S409 in FIG. 11.

If it is determined in step S416 that the receiving unit 308 has not received a return packet (NO in step S416), the control unit 318 determines whether a predetermined time period has elapsed from the transmission of the charging authentication packet in step S415 or not (step S418).

If it is determined in step S418 that the predetermined time period has not elapsed (NO in step S418), the process returns to step S416.

If it is determined in step S418 that the predetermined time period has elapsed (YES in step S418), the process returns to step S401 in FIG. 11.

According to the second communication/charging process illustrated in FIGS. 11 and 12, the Q value of the antenna 302 is set to a low Q value when a packet such as a request confirmation packet is transmitted, and the Q value of the antenna 302 is set to a high Q value when power for charging the battery 222 of the information processing apparatus 200 is transmitted. Accordingly, the same effects as those in the above-described second communication/charging process illustrated in FIGS. 9 and 10 can be obtained.

Figure 27:
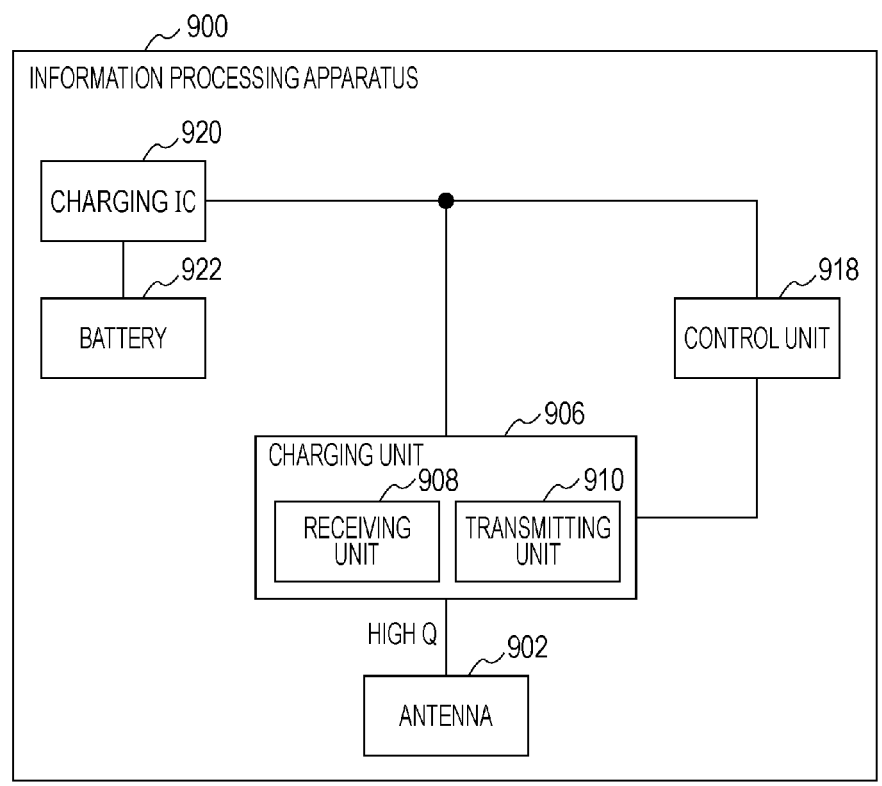
FIG. 27 is a block diagram illustrating a schematic configuration of an information processing apparatus according to the fifth embodiment.

Furthermore, in a case where the information processing apparatus 900 illustrated in FIG. 27 that has a noncontact charging function and that does not have a noncontact communication function exists near the charging apparatus 300, the Q value of the antenna 302 is set to a high Q value when power for charging a battery 922 of the information processing apparatus 900 is transmitted. Thus, even in the case where the information processing apparatus 900 exists near the charging apparatus 300, noncontact charging can be efficiently performed by using the single antenna.

Figure 13:
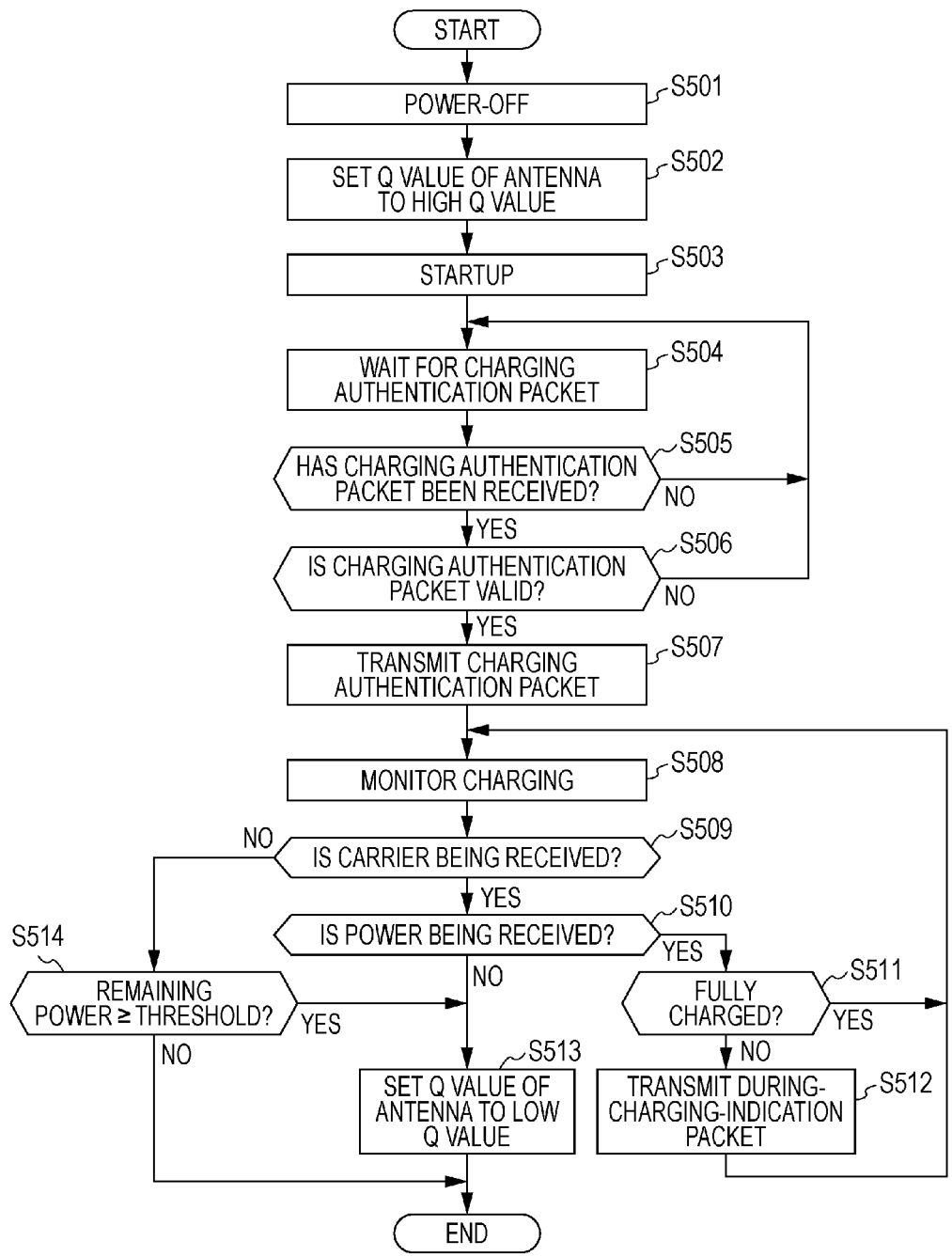
FIG. 13 is a flowchart of a third communication/charging process performed by the information processing apparatus according to the first embodiment.

Third Communication/Charging Process Performed by Information Processing Apparatus According to first embodiment Hereinafter, a third communication/charging process performed by the information processing apparatus 200 according to the first embodiment of the invention will be described. FIG. 13 is a flowchart of the third communication/charging process performed by the information processing apparatus 200 according to the first embodiment of the invention. This process is performed when the remaining power of the battery 222 is too low to supply power to the communication unit 212 in the information processing apparatus 200.

Referring to FIG. 13, when the remaining power of the battery 222 is too low to supply power to the communication unit 212 in the information processing apparatus 200, thereby causing the power of the information processing apparatus 200 to be turned off (step S501), the control unit 218 transmits a setting signal for setting the Q value of the antenna 202 to a high Q value, for example, 50 to several hundred (an example of the second value), to the Q value setting switch 204. The Q value setting switch 204 that has received the setting signal sets the Q value of the antenna 202 to the high Q value (step S502).

Subsequently, when the receiving unit 208 of the charging unit 206 receives power from the charging apparatus 300 or the charging apparatus 700 illustrated in FIG. 19 described below, the charging unit 206 is started by the received power (step S503).

Subsequently, the control unit 218 waits for a charging authentication packet transmitted from the charging apparatus 300 or the charging apparatus 700 illustrated in FIG. 19 (step S504). In step S504, the charging apparatus 300 or the charging apparatus 700 performs communication at a sufficiently-low data transmission rate so that communication can be performed even if the Q value of the antenna 202 is high.

Subsequently, the control unit 218 determines whether the receiving unit 208 of the charging unit 206 has received a charging authentication packet or not (step S505). If the receiving unit 208 has not received a charging authentication packet (NO in step S505), the process returns to step S504.

If it is determined in step S505 that the receiving unit 208 has received a charging authentication packet (YES in step S505), the control unit 218 determines whether the received charging authentication packet is valid or not (step S506). If the charge authentication packet is not valid (NO in step S506), the process returns to step S504.

If it is determined in step S506 that the charging authentication packet is valid (YES in step S506), the control unit 218 causes the transmitting unit 210 of the charging unit 206 to transmit a charging authentication packet to the charging apparatus 300 or the charging apparatus 700 (step S507).

Subsequently, the control unit 218 monitors charging of the battery 222 (step S508).

Subsequently, the control unit 218 determines whether the receiving unit 208 of the charging unit 206 is receiving a carrier or not (step S509).

If it is determined in step S509 that the receiving unit 208 of the charging unit 206 is receiving a carrier (YES in step S509), the control unit 218 determines whether the receiving unit 208 of the charging unit 206 is receiving power for charging the battery 222 or not (step S510).

If it is determined in step S510 that the receiving unit 208 is receiving charging power (YES in step S510), the control unit 218 obtains remaining power information of the battery 222 from the charging IC 220 and determines whether the battery 222 is fully charged or not (step S511).

If it is determined in step S511 that the battery 222 is not fully charged (NO in step S511), the control unit 218 causes the transmitting unit 210 of the charging unit 206 to transmit a during-charging-indication packet to the charging apparatus 300 or the charging apparatus 700 (step S512), and the process returns to step S508. In step S512, communication is performed at a sufficiently-low data transmission rate so that communication can be performed even if the Q value of the antenna 202 is high.

If it is determined in step S511 that the battery 222 is fully charged (YES in step S511), the control unit 218 does not cause the transmitting unit 210 of the charging unit 206 to transmit a during-charging-indication packet to the charging apparatus 300, and the process returns to step S508.

If it is determined in step S510 that the receiving unit 208 is not receiving charging power, that is, if reception of power from the charging apparatus 300 stops because the control unit 218 does not cause the transmitting unit 210 of the charging unit 206 to transmit a during-charging-indication packet (NO in step S510), the control unit 218 transmits a setting signal for setting the Q value of the antenna 202 to a low Q value to the Q value setting switch 204, and the Q value setting switch 204 that has received the setting signal sets the Q value of the antenna 202 to the low Q value (step S513). Then, the process ends.

On the other hand, if it is determined in step S509 that the receiving unit 208 of the charging unit 206 is not receiving a carrier, that is, if the information processing apparatus 200 has been moved to the outside of a communication area of the charging apparatus 300 (NO in step S509), the control unit 218 obtains remaining power information of the battery 222 from the charging IC 220 and determines whether the remaining power of the battery 222 is equal to or higher than a threshold or not (step S514).

If it is determined in step S514 that the remaining power of the battery 222 is equal to or higher than the threshold (YES in step S514), the process proceeds to step S513.

If it is determined in step S514 that the remaining power of the battery 222 is lower than the threshold (NO in step S514), the process ends.

According to the third communication/charging process illustrated in FIG. 13, when the remaining power of the battery 222 is too low to supply power to the communication unit 212 in the information processing apparatus 200, thereby causing the power of the information processing apparatus 200 to be turned off, the Q value of the antenna 202 is set to a high Q value. Thus, even in a state where the information processing apparatus 200 is turned off and is incapable of performing noncontact communication, noncontact charging can be efficiently performed.

Configuration of information processing system according to second embodiment

Figure 14A:
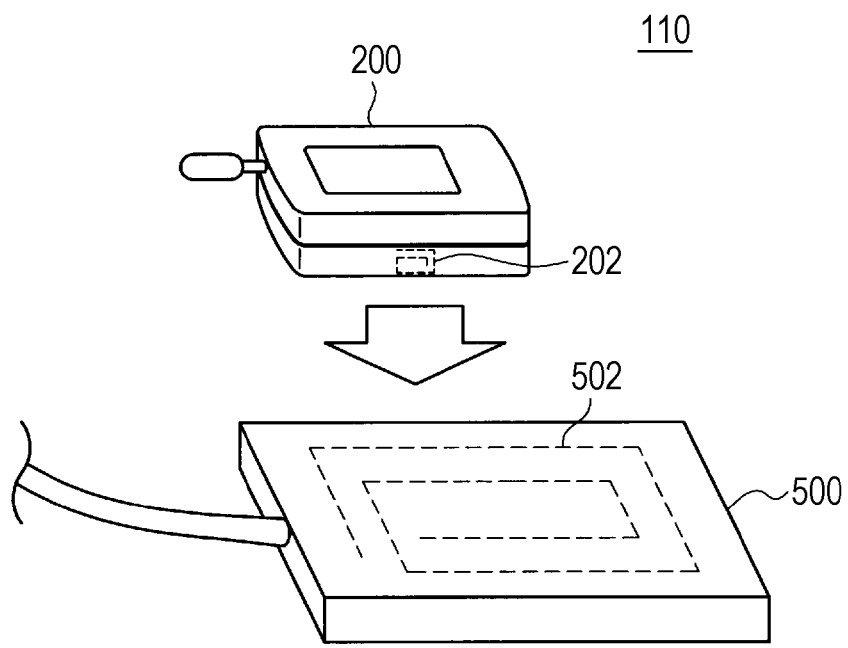
FIG. 14A illustrates an information processing system according to a second embodiment.
Figure 14B:
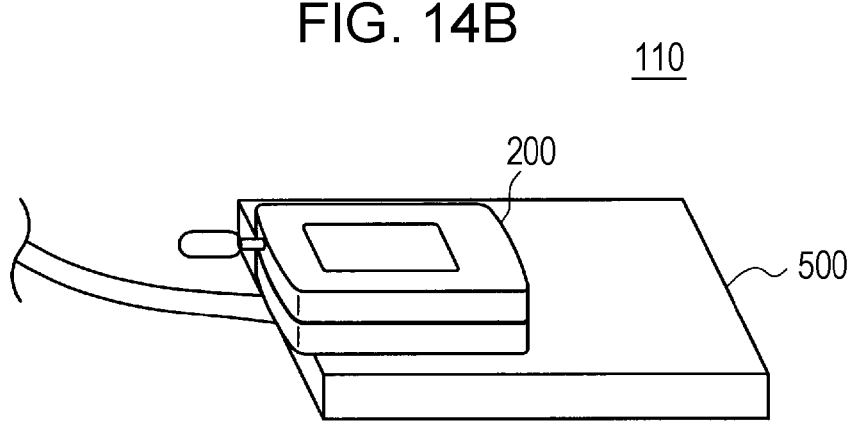
FIG. 14B illustrates the information processing system according to the second embodiment.

Hereinafter, an information processing system according to a second embodiment of the invention will be described. FIGS. 14A and 14B illustrate an information processing system 110 according to the second embodiment of the invention.

Referring to FIG. 14A, the information processing system 110 includes the above-described information processing apparatus 200 illustrated in FIG. 2 and a reader/writer 500 that has a noncontact communication function and that does not have a noncontact charging function.

The information processing apparatus 200 has a battery therein (not illustrated) and is provided with the single antenna 202 that is used for communication with the reader/writer 500.

The reader/writer 500 is provided with a single antenna 502 that is used for communication with the information processing apparatus 200.

As illustrated in FIG. 14B, when the information processing apparatus 200 is placed on the reader/writer 500 or when the information processing apparatus 200 is close to the reader/writer 500 in the information processing system 110, noncontact communication is performed.

In the information processing system 110 according to the second embodiment, the information processing apparatus 200 performs the above-described second communication/charging process illustrated in FIGS. 9 and 10, and the reader/writer 500 performs a communication process described below with reference to FIG. 16. Accordingly, noncontact communication between the information processing apparatus 200 and the reader/writer 500 can be efficiently performed by using the single antennas in both the apparatuses.

Schematic Configuration of Reader/Writer According to second embodiment

Figure 15:
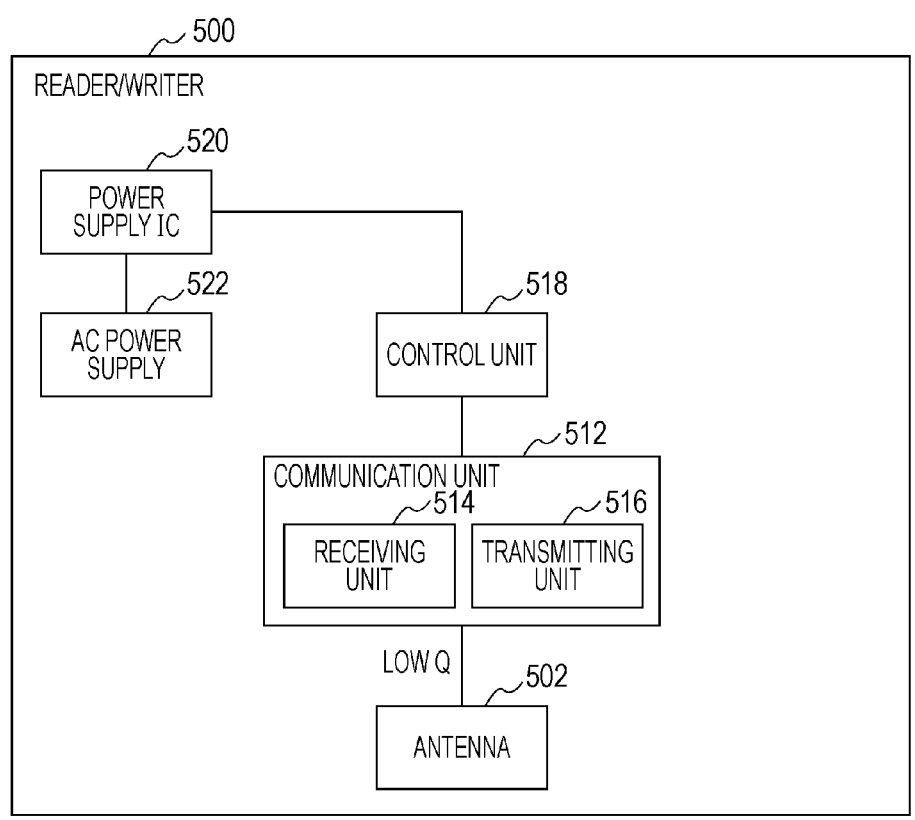
FIG. 15 is a block diagram illustrating a schematic configuration of a reader/writer according to the second embodiment.

Next, the reader/writer 500 according to the second embodiment of the invention will be described. FIG. 15 is a block diagram illustrating a schematic configuration of the reader/writer 500 according to the second embodiment of the invention.

Referring to FIG. 15, the reader/writer 500 includes an antenna 502, a communication unit 512, a control unit 518, and a power supply IC 520 connected to an AC power supply 522.

The antenna 502 transmits a polling signal and a communication packet. The Q value of the antenna 502 is set to a low Q value. The communication unit 512 includes a receiving unit 514 that receives a return packet transmitted from the information processing apparatus 200 and a transmitting unit 516 that transmits a polling signal and a communication packet.

The control unit 518 controls the communication unit 512 and the power supply IC 520. The power supply IC 520 efficiently supplies power from the AC power supply 522 to each unit of the reader/writer 500. Alternatively, the power supply IC 520 may supply power from a DC power supply (not illustrated) to each unit of the reader/writer 500.

Communication process performed by reader/writer according to second embodiment

Next, a communication process performed by the reader/writer 500 according to the second embodiment of the invention will be described. FIG. 16 is a flowchart of the communication process performed by the reader/writer 500 according to the second embodiment of the invention.

Figure 16:
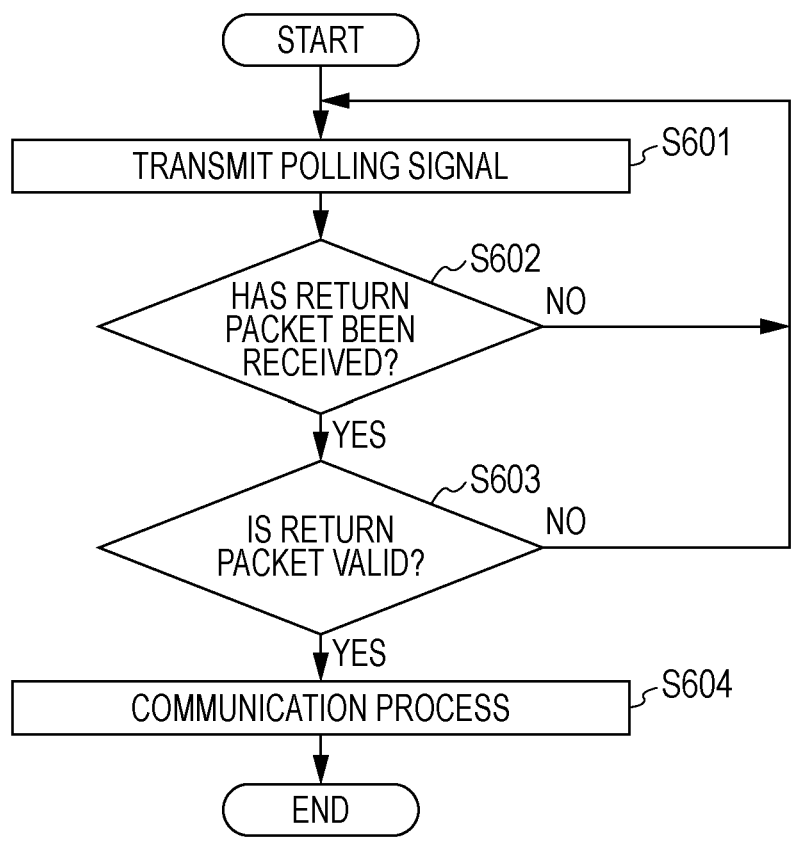
FIG. 16 is a flowchart of a communication process performed by the reader/writer according to the second embodiment.

Referring to FIG. 16, after the power of the reader/writer 500 has been turned on, the control unit 518 causes the transmitting unit 516 of the communication unit 512 to transmit a polling signal (step S601).

Subsequently, the control unit 518 determines whether the receiving unit 514 of the communication unit 512 has received a return packet or not (step S602).

If it is determined in step S602 that the receiving unit 514 has not received a return packet (NO in step S602), the process returns to step S601.

If it is determined in step S602 that the receiving unit 514 has received a return packet (YES in step S602), the control unit 518 determines whether the received return packet is valid or not (step S603).

If it is determined in step S603 that the return packet is not valid (NO in step S603), the process returns to step S601.

If it is determined in step S603 that the return packet is valid (YES in step S603), the control unit 518 performs a normal noncontact communication process (step S604), and the process ends.

Configuration of information processing system according to third embodiment

Figure 17A:
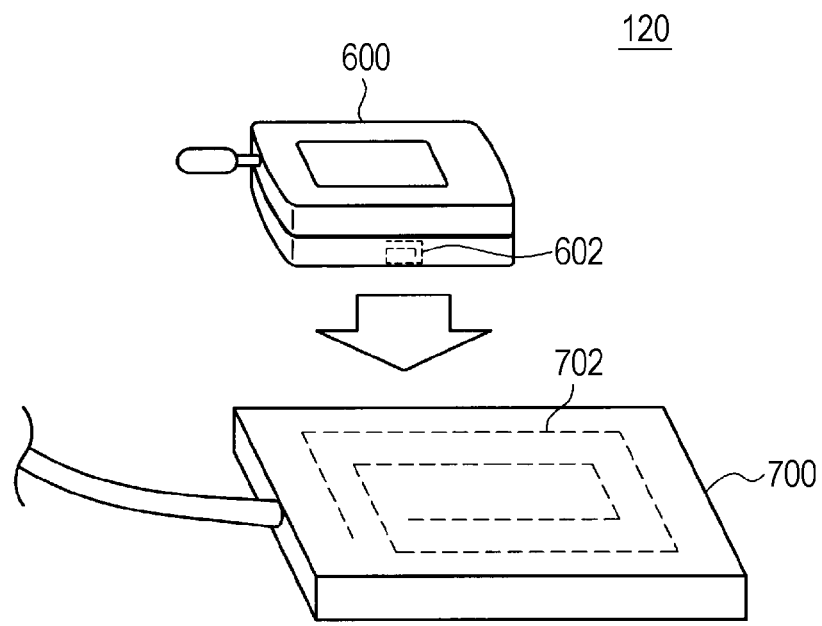
FIG. 17A illustrates an information processing system according to a third embodiment.
Figure 17B:
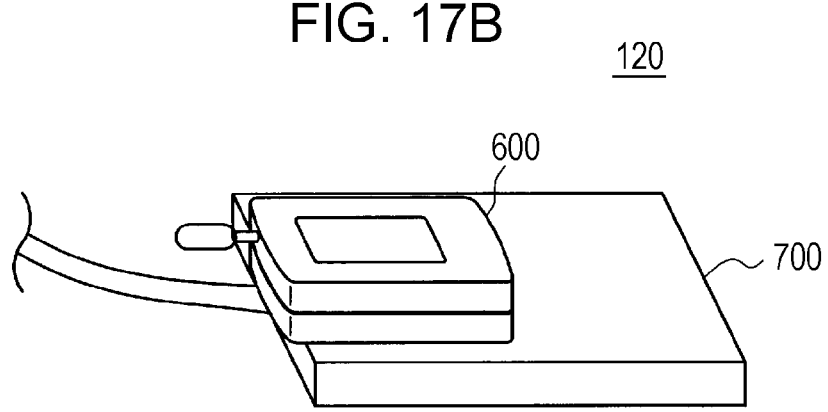
FIG. 17B illustrates the information processing system according to the third embodiment.

Hereinafter, an information processing system according to a third embodiment of the invention will be described. FIGS. 17A and 17B illustrate an information processing system 120 according to the third embodiment of the invention.

Referring to FIG. 17A, the information processing system 120 includes an information processing apparatus 600, such as a mobile phone terminal, and the charging apparatus 700 that has a noncontact charging function and that does not have a noncontact communication function.

The information processing apparatus 600 has a battery therein (not illustrated) and is provided with a single antenna 602 that is used for receiving power for charging the battery.

The charging apparatus 700 is provided with a single antenna 702 that is used for transmitting power for charging the battery included in the information processing apparatus 600.

As illustrated in FIG. 17B, when the information processing apparatus 600 is placed on the charging apparatus 700 or when the information processing apparatus 600 is close to the charging apparatus 700 in the information processing system 120, noncontact charging of the battery included in the information processing apparatus 600 is performed.

In the information processing system 120 according to the third embodiment, the information processing apparatus 600 performs a communication/charging process described below with reference to FIGS. 20 and 21, and the charging apparatus 700 performs a charging process described below with reference to FIG. 22. Accordingly, noncontact charging between the information processing apparatus 600 and the charging apparatus 700 can be efficiently performed by using the single antennas in both the apparatuses.

Configuration of information processing apparatus according to third embodiment

Next, the information processing apparatus 600 according to the third embodiment of the invention will be described. FIG. 18 is a block diagram illustrating a schematic configuration of the information processing apparatus 600 according to the third embodiment of the invention.

Referring to FIG. 18, the information processing apparatus 600 includes the antenna 602, a Q value setting switch 604, a charging unit 606, a communication unit 612, a control unit 618, a charging IC 620, a battery 622, a voltage detecting circuit 624, and a limiting resistor 626 connected to a ground (GND) 628.

The antenna 602 receives a packet transmitted from the charging apparatus 700. Also, the antenna 602 receives power for charging the battery 622 from the charging apparatus 700.

The Q value setting switch 604 selectively sets the Q value of the antenna 602 on the basis of a setting signal transmitted from the control unit 618. For example, the Q value setting switch 604 selectively sets the Q value of the antenna 602 so that the antenna 602 has a low Q1 value, a low Q2 value, or a high Q value.

The charging unit 606 includes a receiving unit 608 that receives power for charging the battery 622 received by the antenna 602. Also, the charging unit 606 includes a transmitting unit 610 that transmits a during-charging-indication packet for intermittently requesting continuation of transmission of charging power to the charging apparatus 700 until charging of the battery 622 is completed. The transmitting unit 610 transmits the during-charging-indication packet by using load modulation at a data transmission rate lower than a normal data transmission rate.

The communication unit 612 includes a receiving unit 614 that receives a packet received by the antenna 602. Also, the communication unit 612 includes a transmitting unit 616 that transmits a response packet to the charging apparatus 700. The transmitting unit 616 transmits a response packet by using load modulation at a normal data transmission rate.

The control unit 618 controls the Q value setting switch 604, the charging unit 606, the communication unit 612, the charging IC 620, and the voltage detecting circuit 624. The control unit 618 controls connection between the antenna 602 and the limiting resistor 626 on the basis of a control signal transmitted from the voltage detecting circuit 624.

The charging IC 620 performs charging of the battery 620 and efficiently supplies power from the battery 622 to each unit of the information processing apparatus 600.

The voltage detecting circuit 624 detects a voltage input to the antenna 602 and transmits a control signal corresponding to the input voltage to the control unit 618. On the basis of the control signal transmitted from the voltage detecting circuit 624, the control unit 618 transmits a setting signal for setting the Q value of the antenna 602 to the low Q2 value to the Q value setting switch 604 when a high voltage for charging the battery 622 is input to the antenna 602 in a case where the Q value of the antenna 602 is set to the low Q1 value.

The limiting resistor 626 is provided for preventing breakdown of the communication unit 612 when a high voltage for charging the battery 622 is input to the antenna 602 in a case where the Q value of the antenna 602 is set to the low Q1 value.

Configuration of charging apparatus according to third embodiment

Next, the charging apparatus 700 according to the third embodiment of the invention will be described. FIG. 19 is a block diagram illustrating a schematic configuration of the charging apparatus 700 according to the third embodiment of the invention.

Referring to FIG. 19, the charging apparatus 700 includes an antenna 702, a charging unit 706, a control unit 718, and a power supply IC 720 connected to an AC power supply 722.

The antenna 702 transmits a charging authentication packet and transmits power for charging the battery 622 of the information processing apparatus 600. The Q value of the antenna 702 is set to a high Q value. The charging unit 706 includes a receiving unit 708 that receives a during-charging-indication packet transmitted from the information processing apparatus 600 and a transmitting unit 710 that transmits power for charging the battery 622 of the information processing apparatus 600.

The control unit 718 controls the charging unit 706 and the power supply IC 720. The power supply IC 720 efficiently supplies power from the AC power supply 722 to each unit of the charging apparatus 700. Alternatively, the power supply IC 720 may supply power from a DC power supply (not illustrated) to each unit of the charging apparatus 700.

Communication/charging process performed by information processing apparatus according to third embodiment Next, a communication/charging process performed by the information processing apparatus 600 according to the third embodiment of the invention will be described. FIG. 20 is a flowchart of the communication/charging process performed by the information processing apparatus 600 according to the third embodiment of the invention. FIG. 21 is a flowchart continued from the flowchart illustrated in FIG. 20.

Figure 20:
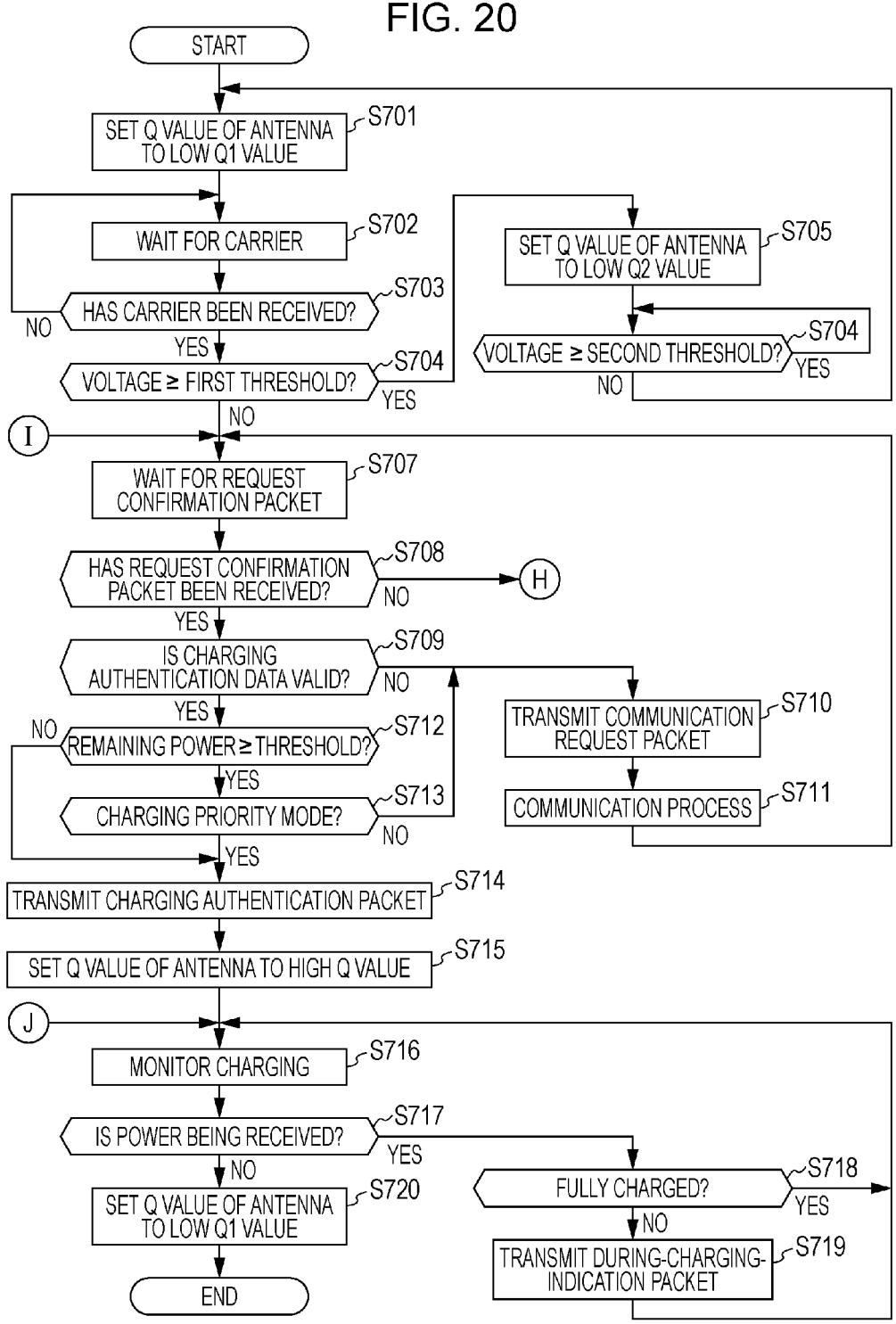
FIG. 20 is a flowchart of a communication/charging process performed by the information processing apparatus according to the third embodiment.

Referring to FIG. 20, after the power of the information processing apparatus 600 has been turned on, the control unit 618 of the information processing apparatus 600 transmits a setting signal for setting the Q value of the antenna 602 to a low Q1 value, for example, 10 to 20 (an example of the first value), to the Q value setting switch 604. The Q value setting switch 604 that has received the setting signal sets the Q value of the antenna 602 to the low Q1 value (step S701).

Subsequently, the control unit 618 causes the receiving unit 614 of the communication unit 612 to wait for a carrier of 13.56 MHz transmitted from the charging apparatus 700 (step S702).

Subsequently, the control unit 618 determines whether the receiving unit 614 has received a carrier or not (step S703). If the receiving unit 614 has not received a carrier (NO in step S703), the process returns to step S702.

If it is determined in step S703 that the receiving unit 614 has received a carrier (YES in step S703), the control unit 618 determines whether the voltage input to the antenna 602 is equal to or higher than a first threshold or not on the basis of a control signal transmitted from the voltage detecting circuit 624 (step S704). If the voltage input to the antenna 602 is equal to or higher than the first threshold and if the Q value of the antenna 602 is set to the low Q1 value by the Q value setting switch 604, it is possible that the circuit of the communication unit 612 is destroyed. That is, the first threshold is set in order to prevent the circuit of the communication unit 612 from being destroyed.

If it is determined in step S704 that the voltage input to the antenna 602 is equal to or higher than the first threshold (YES in step S704), the control unit 618 transmits a setting signal for setting the Q value of the antenna 602 to a low Q2 value, for example, 10 to 20, to the Q value setting switch 604. The Q value setting switch 604 that has received the setting signal sets the Q value of the antenna 602 to the low Q2 value (step S705). That is, in step S705, the antenna 602 is connected to the limiting resistor 626.

Subsequently, the control unit 618 determines whether the voltage input to the antenna 602 is equal to or higher than a second threshold or not on the basis of a control signal transmitted from the voltage detecting circuit 624 (step S706).

If it is determined in step S706 that the voltage input to the antenna 602 is equal to or higher than the second threshold (YES in step S706), step S706 is repeated.

If it is determined in step S706 that the voltage input to the antenna 602 is lower than the second threshold (NO in step S706), the process returns to step S701. That is, in step S701, the antenna 602 is disconnected from the limiting resistor 626. The reason why different thresholds are used in steps S704 and S706 is that the second threshold is set considering a voltage drop in the limiting resistor 626 from the first threshold.

On the other hand, if it is determined in step S704 that the voltage input to the antenna 602 is lower than the first threshold (NO in step S704), the control unit 618 waits for a request confirmation packet transmitted from the outside (step S707). If reception of a carrier is interrupted during waiting for a request confirmation packet in step S707, the process returns to step S702.

Subsequently, the control unit 618 determines whether the receiving unit 614 has received a request confirmation packet or not (step S708).

If it is determined in step S708 that the receiving unit 614 has received a request confirmation packet (YES in step S708), the control unit 618 determines whether charging authentication data contained in the received request confirmation packet is valid or not (step S709).

If it is determined in step S709 that the charging authentication data is not valid (NO in step S709), the packet is a normal communication request. Thus, the control unit 618 causes the transmitting unit 616 to transmit a communication request packet to the outside (step S710) and performs a normal noncontact communication process with the outside (step S711). Then, the process returns to step S707.

If it is determined in step S709 that the charging authentication data is valid (YES in step S709), the control unit 618 obtains remaining power information of the battery 622 from the charging IC 620, and determines whether the remaining power of the battery 622 is equal to or higher than a threshold or not on the basis of the obtained remaining power information of the battery 622 (step S712).

If it is determined in step S712 that the remaining power of the battery 622 is equal to or higher than the threshold (YES in step S712), the control unit 618 determines whether a charging priority mode is set in the information processing apparatus 600 or not, higher priority being put on charging than communication in the charging priority mode (step S713). Here, the charging priority mode may be set by a user, or by the control unit 618 on the basis of the status of the information processing apparatus 600.

If it is determined in step S713 that the charging priority mode is not set (NO in step S713), the process proceeds to step S710 to preferentially perform communication.

If it is determined in step S712 that the remaining power of the battery 622 is lower than the threshold (NO in step S712) or if it is determined in step S713 that the charging priority mode is set (YES in step S713), the control unit 618 causes the transmitting unit 616 to transmit a charging authentication packet to the charging apparatus 700 (step S714).

The charging apparatus 700 that has received the charging authentication packet transmitted in step S714 starts transmitting power for charging the battery 622 of the information processing apparatus 600 after a predetermined time period. Thus, the control unit 618 transmits a setting signal for setting the Q value of the antenna 602 to a Q value higher than the Q value set in step S701, for example, 50 to several hundred (an example of the second value), to the Q value setting switch 604. The Q value setting switch 604 that has received the setting signal sets the Q value of the antenna 602 to the high Q value (step S715).

Subsequently, the control unit 618 monitors charging of the battery 622 (step S716).

Subsequently, the control unit 618 determines whether the receiving unit 608 of the charging unit 606 is receiving power for charging the battery 622 or not (step S717).

If it is determined in step S717 that the receiving unit 608 is receiving charging power (YES in step S717), the control unit 618 obtains remaining power information of the battery 622 from the charging IC 620 and determines whether the battery 622 is fully charged or not (step S718).

If it is determines in step S718 that the battery 622 is not fully charged (NO in step S718), the control unit 618 causes the transmitting unit 610 of the charging unit 606 to transmit a during-charging-indication packet to the charging apparatus 700 (step S719), and the process returns to step S716. In step S719, communication is performed at a sufficiently-low data transmission rate so that communication can be performed even if the Q value of the antenna 602 is high.

If it is determined in step S718 that the battery 622 is fully charged (YES in step S718), the control unit 618 does not cause the transmitting unit 610 of the charging unit 606 to transmit a during-charging-indication packet to the charging apparatus 700, and the process returns to step S716.

If it is determined in step S717 that the receiving unit 608 is not receiving charging power, that is, if reception of power from the charging apparatus 700 is stopped because the control unit 618 does not cause the transmitting unit 610 of the charging unit 606 to transmit a during-charging-indication packet, or if the information processing apparatus 600 is moved to the outside of a communication area of the charging apparatus 700 (NO in step S717), the control unit 618 transmits a setting signal for setting the Q value of the antenna 602 to a low Q1 value to the Q value setting switch 604. The Q value setting switch 604 that has received the setting signal sets the Q value of the antenna 602 to the low Q1 value (step S720), and the process ends.

Figure 21:
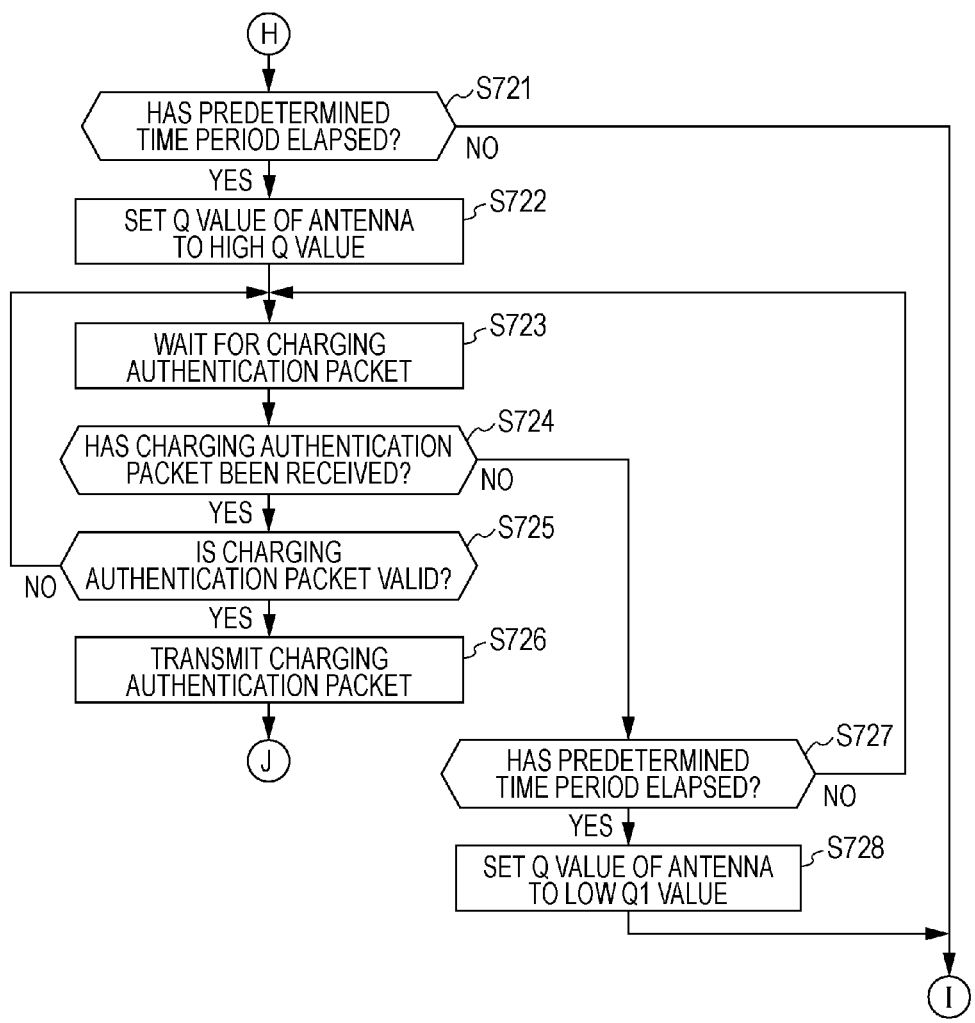
FIG. 21 is a flowchart of the communication/charging process continued from the flowchart in FIG. 20.

On the other hand, if it is determined in step S708 that the receiving unit 614 of the communication unit 612 has not received a request confirmation packet (NO in step S708), the process proceeds to step S721 in FIG. 21, where the control unit 618 determines whether a predetermined time period has elapsed from the waiting for a request confirmation packet in step S707 or not.

If it is determined in step S721 that the predetermined time period has not elapsed (NO in step S721), the process returns to step S707 in FIG. 20.

If it is determined in step S721 that the predetermined time period has elapsed (YES in step S721), the control unit 618 assumes that the charging apparatus 700 that has a noncontact charging function and that does not have a noncontact communication function exists near the information processing apparatus 600, and transmits a setting signal for setting the Q value of the antenna 602 to a Q value higher than the Q value set in step S701, for example, 50 to several hundred (an example of the second value), to the Q value setting switch 604. The Q value setting switch 604 that has received the setting signal sets the Q value of the antenna 602 to the high Q value (step S722).

Subsequently, the control unit 618 waits for a charging authentication packet transmitted from the charging apparatus 700 (step S723). In step S723, the charging apparatus 700 performs communication at a sufficiently-low data transmission rate so that communication can be performed even if the Q value of the antenna 602 is high.

Subsequently, the control unit 618 determines whether the receiving unit 608 of the charging unit 606 has received a charging authentication packet or not (step S724).

If it is determined in step S724 that the receiving unit 608 has received a charging authentication packet (YES in step S724), the control unit 618 determines whether the received charging authentication packet is valid or not (step S725). If the charging authentication packet is not valid (NO in step S725), the process returns to step S723.

If it is determined in step S725 that the charging authentication packet is valid (YES in step S725), the control unit 618 causes the transmitting unit 610 of the charging unit 606 to transmit a charging authentication packet to the charging apparatus 700 (step S726), and the process proceeds to step S716 in FIG. 20.

On the other hand, if it is determined in step S724 that the receiving unit 608 has not received a charging authentication packet (NO in step S724), the control unit 618 determines whether a predetermined time period has elapsed from the waiting for a charging authentication packet in step S723 or not (step S727).

If it is determined in step S727 that the predetermined time period has not elapsed (NO in step S727), the process returns to step S723.

If it is determined in step S727 that the predetermined time period has elapsed (YES in step S727), the control unit 618 transmits a setting signal for setting the Q value of the antenna 602 to a low Q1 value, for example, 10 to 20 (an example of the first value), to the Q value setting switch 604. The Q value setting switch 604 that has received the setting signal sets the Q value of the antenna 602 to the low Q1 value (step 728). Then, the process returns to step S707 in FIG. 20.

According to the communication/charging process illustrated in FIGS. 20 and 21, even in a case where the charging apparatus 700 that has a noncontact charging function and that does not have a noncontact communication function exists near the information processing apparatus 600, the Q value of the antenna 602 is set to a high Q value when power for charging the battery 622 is received from the charging apparatus 700. Accordingly, even in a case where the charging apparatus 700 exists near the information processing apparatus 600, noncontact charging can be performed by using the single antenna.

Furthermore, in a case where the Q value of the antenna 602 is set to a low Q1 value by the Q value setting switch 604, the Q value of the antenna 602 is set to a low Q2 value when a voltage equal to or higher than the first threshold is input to the antenna 602. Accordingly, the antenna 602 is connected to the limiting resistor 626. This prevents a high voltage from being applied to the communication unit 612 to destroy the circuit of the communication unit 612.

Charging process performed by charging apparatus according to third embodiment

Next, a charging process performed by the charging apparatus 700 according to the third embodiment of the invention will be described. FIG. 22 is a flowchart of the charging process performed by the charging apparatus 700 according to the third embodiment of the invention.

Referring to FIG. 22, the control unit 718 of the charging apparatus 700 causes the transmitting unit 710 of the charging unit 706 to transmit a charging authentication packet (step S801). In step S801, the charging apparatus 700 performs communication at a sufficiently-low data transmission rate so that communication can be performed even if the Q value of the antenna 702 is high.

Subsequently, the control unit 718 determines whether the receiving unit 708 of the charging unit 706 has received a return packet or not (step S802). If the receiving unit 708 has not received a return packet (NO in step S802), the process returns to step S801.

If it is determined in step S802 that the receiving unit 708 has received a return packet (YES in step S802), the control unit 718 determines whether the received return packet is valid or not (step S803). If the return packet is not valid (NO in step S803), the process returns to step S801.

If it is determined in step S803 that the return packet is valid (YES in step S803), the control unit 718 causes the transmitting unit 710 of the charging unit 706 to transmit power for charging the battery 622 of the information processing apparatus 600 (step S804).

Subsequently, the control unit 718 determines, at predetermined time intervals, whether the receiving unit 708 of the charging unit 706 has received a during-charging-indication packet transmitted from the information processing apparatus 600 or not (step S805).

If it is determined in step S805 that the receiving unit 708 has received a during-charging-indication packet (YES in step S805), charging of the battery 622 of the information processing apparatus 600 has not been completed, and thus the process returns to step S804.

If it is determined in step S805 that the receiving unit 708 has not received a during-charging-indication packet (NO in step S805), charging of the battery 622 of the information processing apparatus 600 has been completed, or the information processing apparatus 600 has been moved to the outside of a communication area of the charging apparatus 700. Thus, the control unit 718 causes the transmitting unit 710 of the charging unit 706 to stop transmitting charging power (step S806), and the process ends.

Configuration of information processing system according to fourth embodiment

Figure 23A:
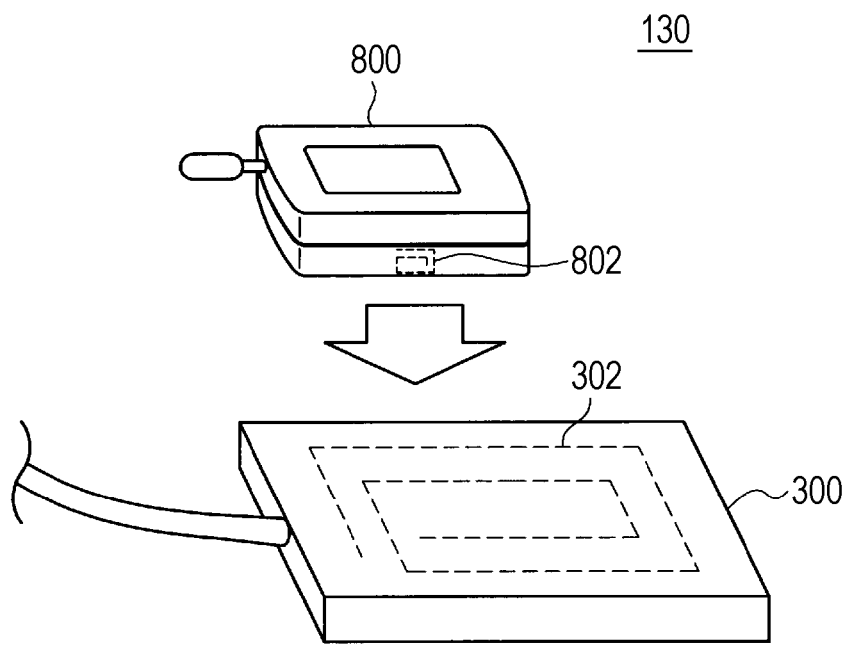
FIG. 23A illustrates an information processing system according to a fourth embodiment.
Figure 23B:
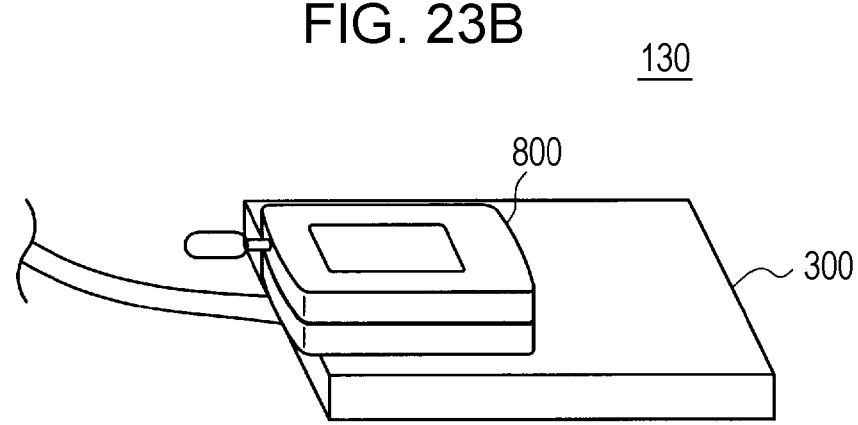
FIG. 23B illustrates the information processing system according to the fourth embodiment.

Hereinafter, an information processing system according to a fourth embodiment of the invention will be described. FIGS. 23A and 23B illustrate an information processing system 130 according to the fourth embodiment of the invention.

Referring to FIG. 23A, the information processing system 130 includes the information processing apparatus 800, such as a mobile phone terminal, that has a noncontact communication function and that does not have a noncontact charging function and the charging apparatus 300. The charging apparatus 300 may have a reader/writer function.

The information processing apparatus 800 has a battery therein (not illustrated) and is provided with a single antenna 802 that is used for communicating with the charging apparatus 300.

The charging apparatus 300 is provided with the single antenna 302 that is used for communicating with the information processing apparatus 800 and transmitting power for charging the battery of the information processing apparatus 200 illustrated in FIG. 2, for example.

As illustrated in FIG. 23B, in the information processing system 130, noncontact communication is performed when the information processing apparatus 800 is placed on the charging apparatus 300 or when the information processing apparatus 800 is close to the charging apparatus 300.

In the information processing system 130 according to the fourth embodiment, the information processing apparatus 800 performs a communication process described below with reference to FIG. 25, and the charging apparatus 300 performs the above-described second communication/charging process illustrated in FIGS. 11 and 12. Accordingly, noncontact communication between the information processing apparatus 800 and the charging apparatus 300 can be efficiently performed by using the single antennas in both the apparatuses.

Figure 24:
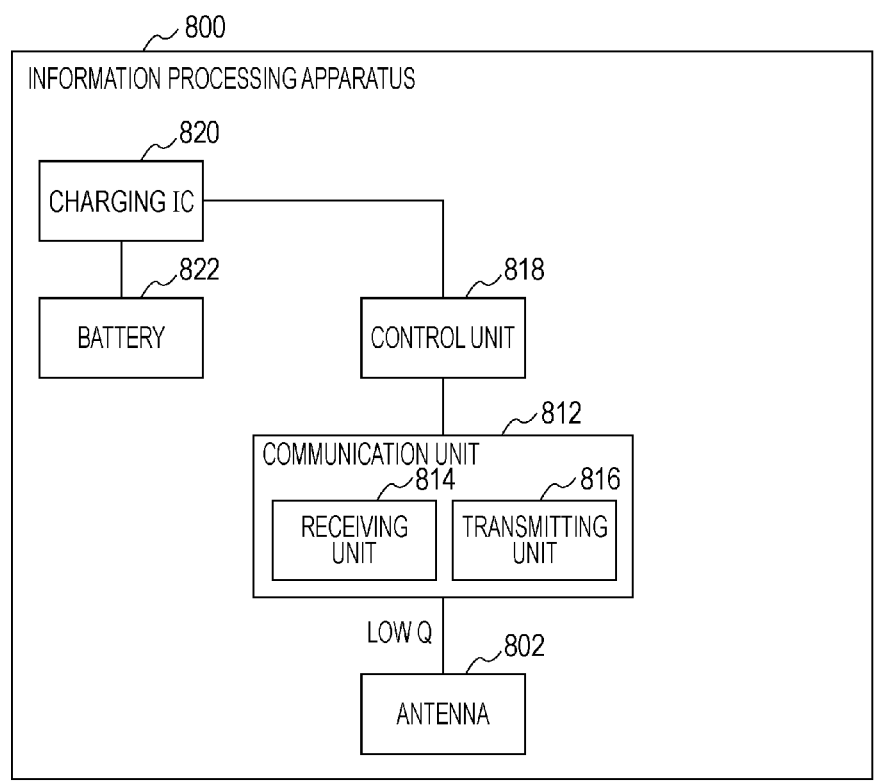
FIG. 24 is a block diagram illustrating a schematic configuration of an information processing apparatus according to the fourth embodiment.

Configuration of information processing apparatus according to fourth embodiment Next, the information processing apparatus 800 according to the fourth embodiment of the invention will be described. FIG. 24 is a block diagram illustrating a schematic configuration of the information processing apparatus 800 according to the fourth embodiment of the invention.

Referring to FIG. 24, the information processing apparatus 800 includes the antenna 802, a communication unit 812, a control unit 818, a charging IC 820, and a battery 822.

The antenna 802 receives a packet transmitted from the charging apparatus 300. The Q value of the antenna 802 is set to a low Q value.

The communication unit 812 includes a receiving unit 814 that receives a packet received by the antenna 802. Also, the communication unit 812 includes a transmitting unit 816 that transmits a response packet to the charging apparatus 300. The transmitting unit 816 transmits a response packet by using load modulation at a normal data transmission rate.

The control unit 818 controls the communication unit 812 and the charging IC 820. The charging IC 820 performs charging of the battery 822 and efficiently supplies the power of the battery 822 to the each unit of the information processing apparatus 800.

Communication process performed by information processing apparatus according to fourth embodiment Next, a communication process performed by the information processing apparatus 800 according to the fourth embodiment of the invention will be described. FIG. 25 is a flowchart of the communication process performed by the information processing apparatus 800 according to the fourth embodiment of the invention.

Referring to FIG. 25, the control unit 818 of the information processing apparatus 800 causes the receiving unit 814 of the communication unit 812 to wait for a carrier of 13.56 MHz, for example, transmitted from the charging apparatus 300 (step S901).

Subsequently, the control unit 818 determines whether the receiving unit 814 has received a carrier or not (step S902). If the receiving unit 814 has not received a carrier (NO in step S902), the process returns to step S901.

If it is determined in step S902 that the receiving unit 814 has received a carrier (YES in step S902), the control unit 818 causes the receiving unit 814 of the communication unit 818 to wait for a polling signal transmitted from the charging apparatus 300 (step S903).

Subsequently, the control unit 818 determines whether the receiving unit 814 has received a polling signal or not (step S904). If the receiving unit 814 has not received a polling signal (NO in step S904), the process returns to step S903.

If it is determined in step S904 that the receiving unit 814 has received a polling signal (YES in step S904), the control unit 818 causes the transmitting unit 816 to transmit a response to the polling signal to the charging apparatus 300 (step S905).

Subsequently, the control unit 818 performs a normal noncontact communication process with the charging apparatus 300 (step S906), and the process ends.

Configuration of information processing system according to fifth embodiment

Figure 26A:
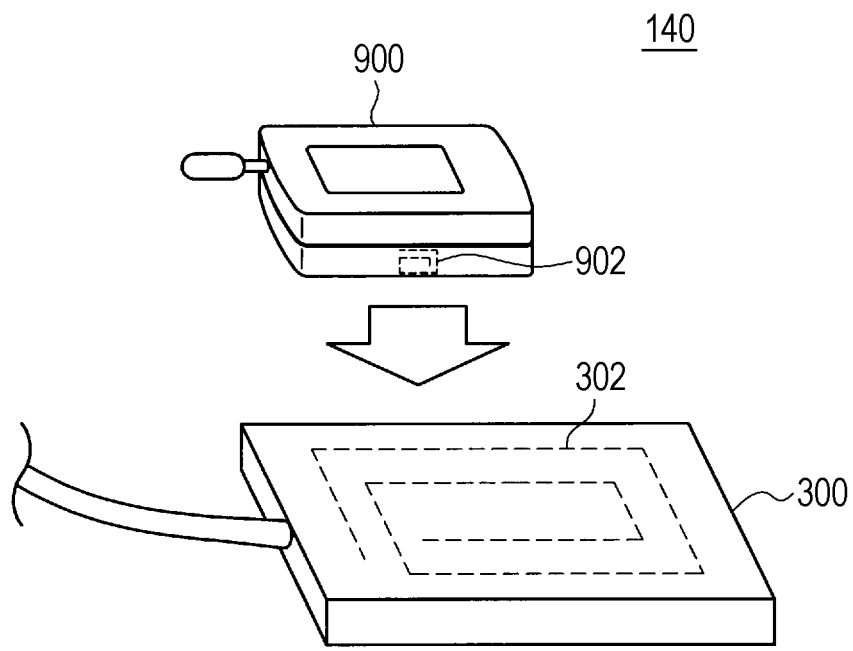
FIG. 26A illustrates an information processing system according to a fifth embodiment.
Figure 26B:
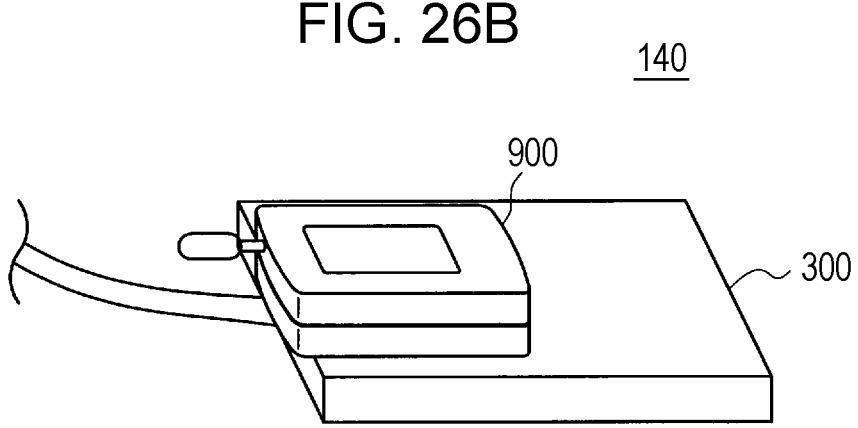
FIG. 26B illustrates the information processing system according to the fifth embodiment.

Hereinafter, an information processing system according to a fifth embodiment of the invention will be described. FIGS. 26A and 26B illustrate an information processing system 140 according to the fifth embodiment of the invention.

Referring to FIG. 26A, the information processing system 140 includes the information processing apparatus 900, such as a mobile phone terminal, that has a noncontact charging function and that does not have a noncontact communication function and the charging apparatus 300. The charging apparatus 300 may have a reader/writer function.

The information processing apparatus 900 has a battery therein (not illustrated) and is provided with a single antenna 902 that is used for communicating with the charging apparatus 300 and receiving power for charging the battery.

The charging apparatus 300 is provided with the single antenna 302 that is used for communicating with the information processing apparatus 900 and transmitting power for charging the battery of the information processing apparatus 900.

As illustrated in FIG. 26B, in the information processing system 140, noncontact charging of the battery of the information processing apparatus 900 is performed when the information processing apparatus 900 is placed on the charging apparatus 300 or when the information processing apparatus 900 is close to the charging apparatus 300.

In the information processing system 140 according to the fifth embodiment, the information processing apparatus 900 performs a communication process described below with reference to FIG. 28, and the charging apparatus 300 performs the above-described second communication/charging process illustrated in FIGS. 11 and 12. Accordingly, noncontact charging between the information processing apparatus 900 and the charging apparatus 300 can be efficiently performed by using single antennas in both the apparatuses.

Configuration of information processing apparatus according to fifth embodiment

Next, the information processing apparatus 900 according to the fifth embodiment of the invention will be described. FIG. 27 is a block diagram illustrating a schematic configuration of the information processing apparatus 900 according to the fifth embodiment of the invention.

Referring to FIG. 27, the information processing apparatus 900 includes the antenna 902, a charging unit 906, a control unit 918, a charging IC 920, and the battery 922.

The antenna 902 receives a packet transmitted from the charging apparatus 300. Also, the antenna 902 receives power for charging the battery 922 from the charging apparatus 300. The Q value of the antenna 902 is set to a high Q value.

The charging unit 906 includes a receiving unit 908 that receives power for charging the battery 922 received by the antenna 902. Also, the charging unit 906 includes a transmitting unit 910 that transmits a during-charging-indication packet for intermittently requesting continuation of transmission of charging power to the charging apparatus 300 until charging of the battery 922 is completed. The transmitting unit 910 transmits the during-charging-indication packet by using load modulation at a data transmission rate lower than a normal data transmission rate.

The control unit 918 controls the charging unit 906 and the charging IC 920. The charging IC 920 performs charging of the battery 922 and efficiently supplies the power of the battery 922 to each unit of the information processing apparatus 900.

Charging process performed by information processing apparatus according to fifth embodiment Next, a charging process performed by the information processing apparatus 900 according to the fifth embodiment of the invention will be described. FIG. 28 is a flowchart of the charging process performed by the information processing apparatus 900 according to the fifth embodiment of the invention.

Figure 28:
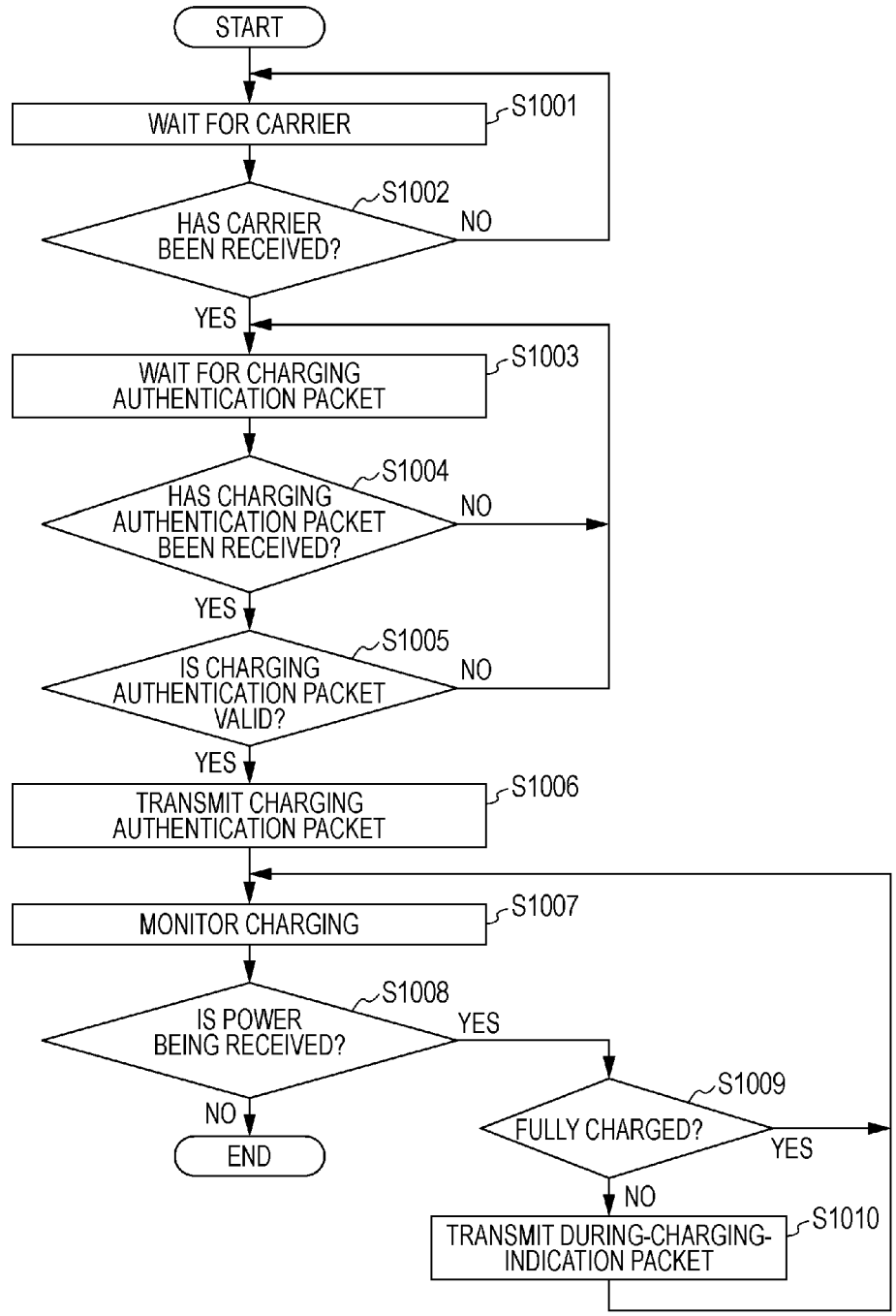
FIG. 28 is a flowchart of a charging process performed by the information processing apparatus according to the fifth embodiment.

Referring to FIG. 28, the control unit 918 of the information processing apparatus 900 causes the receiving unit 908 of the charging unit 906 to wait for a carrier of 13.56 MHz, for example, transmitted from the charging apparatus 300 (step S1001).

Subsequently, the control unit 918 determines whether the receiving unit 908 has received a carrier or not (step S1002).

If the receiving unit 908 has not received a carrier (NO in step S1002), the process returns to step S1001.

If it is determined in step S1002 that the receiving unit 908 has received a carrier (YES in step S1002), the control unit 918 waits for a charging authentication packet transmitted from the charging apparatus 300 (step S1003). In step S1003, the charging apparatus 300 performs communication at a sufficiently-low data transmission rate so that communication can be performed even if the Q value of the antenna 902 is high.

Subsequently, the control unit 918 determines whether the receiving unit 908 has received a charging authentication packet or not (step S1004). If the receiving unit 908 has not received a charging authentication packet (NO in step S1004), the process returns to step S1003.

If it is determined in step S1004 that the receiving unit 908 has received a charging authentication packet (YES in step S1004), the control unit 918 determines whether the received charging authentication packet is valid or not (step S1005). If the charging authentication packet is not valid (NO in step S1005), the process returns to step S1003.

If it is determined in step S1005 that the charging authentication packet is valid (YES in step S1005), the control unit 918 causes the transmitting unit 910 to transmit a charging authentication packet to the charging apparatus 300 (step S1006).

Subsequently, the control unit 918 monitors charging of the battery 922 (step S1007).

Subsequently, the control unit 918 determines whether the receiving unit 908 is receiving power for charging the battery 922 or not (step S1008).

If it is determined in step S1008 that the receiving unit 908 is receiving charging power (YES in step S1008), the control unit 918 obtains remaining power information of the battery 922 from the charging IC 920 and determines whether the battery 922 is fully charged or not (step S1009).

If it is determined in step S1009 that the battery 922 is not fully charged (NO in step S1009), the control unit 918 causes the transmitting unit 910 to transmit a during-charging-indication packet to the charging apparatus 300 (step S1010), and the process returns to step S1007. In step S1010, communication is performed at a sufficiently-low data transmission rate so that communication can be performed even if the Q value of the antenna 902 is high.

If it is determined in step S1009 that the battery 922 is fully charged (YES in step S1009), the control unit 918 does not cause the transmitting unit 910 to transmit a during-charging-indication packet to the charging apparatus 300, and the process returns to step S1007.

If it is determined in step S1008 that the receiving unit 908 is not receiving charging power, that is, if reception of power from the charging apparatus 300 stops because the control unit 918 does not cause the transmitting unit 910 to transmit a during-charging-indication packet, or if the information processing apparatus 900 has been moved to the outside of a communication area of the charging apparatus 300 (NO in step S1008), the process ends.

Programs for information processing system 100 according to embodiment

Program for Information Processing Apparatus 200

By using a program that causes a computer to function as the information processing apparatus 200 according to an embodiment of the invention, noncontact communication and noncontact charging can be efficiently performed by using a single antenna.

Program for charging apparatus 300

By using a program that causes a computer to function as the charging apparatus 300 according to an embodiment of the invention, noncontact communication and noncontact charging can be efficiently performed by using a single antenna.

According to the description given above, there are provided programs (computer programs) that cause a computer to function as the information processing apparatus 200 or the charging apparatus 300 according to an embodiment. Furthermore, an embodiment can also provide a storage medium that stores the above-described programs.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus comprising:
a communication unit configured to perform communication with an external apparatus in a noncontact manner by using a carrier of a predetermined frequency and charging an external battery in a noncontact manner; and
a control unit configured to control a characteristic of the communication unit, and determine to perform at least one of the communication and the charging.

2. The information processing apparatus according to claim 1, wherein the communication unit includes
a resonance circuit having a coil that has a predetermined inductance and a capacitor that has a predetermined electrostatic capacity, and
a Q value changing circuit configured to selectively enable a load for changing a Q value or change a resistance value of the load.

3. The information processing apparatus according to claim 1, wherein the communication unit includes
a resonance circuit having a first coil that has a predetermined inductance and a capacitor that has a predetermined electrostatic capacity, and
a circuit that is placed near the resonance circuit, that is selectively enabled to change a Q value, that is electrically insulated from the resonance circuit, and that has a second coil.

4. The information processing apparatus according to claim 1, wherein the controlling unit is configured to:
obtain a response signal that is transmitted from the external apparatus, that is a response to charging authentication information transmitted to the external apparatus, and that serves as information about charging of the battery, and
obtain charging continuation information that is intermittently transmitted from the external apparatus during charging of the battery and that serves as information about charging of the battery,
wherein the controlling unit determines whether charging of the battery is to be performed or not on the basis of the response signal or the charging continuation information, and
wherein the setting unit sets a Q value of the communication unit to a first value when the determining unit determines that charging of the battery is to be performed and sets the Q value of the communication unit to a second value when the controlling unit determines that charging of the battery is not to be performed.

5. The information processing apparatus according to claim 4, further comprising:
a power transmitting unit configured to transmit power for charging the battery to the external apparatus; and
a power transmission stop unit configured to stop transmission of the power by the power transmitting unit when the charging continuation information obtaining unit stops obtaining the charging continuation information that is intermittently obtained.

6. An information processing apparatus comprising:
a battery,
a communication unit configured to perform communication with the charging apparatus in a noncontact manner by using a carrier of a predetermined frequency and charging the battery in a noncontact manner; and
a control unit configured to control a characteristic of the communication unit, and determine to perform at least one of the communication and the charging.

7. The information processing apparatus according to claim 6, wherein the communication unit includes
a resonance circuit having a coil that has a predetermined inductance and a capacitor that has a predetermined electrostatic capacity, and
a Q value changing circuit configured to selectively enable a load for changing a Q value or change a resistance value of the load.

8. The information processing apparatus according to claim 6, wherein the communication unit includes
a resonance circuit having a first coil that has a predetermined inductance and a capacitor that has a predetermined electrostatic capacity, and
a circuit that is placed near the resonance circuit, that is selectively enabled to change a Q value, that is electrically insulated from the resonance circuit, and that has a second coil.

* * * * *